US011921220B2

(12) United States Patent
Torimoto et al.

(10) Patent No.: US 11,921,220 B2
(45) Date of Patent: Mar. 5, 2024

(54) POSITIONING SYSTEM, BASE STATION, AND POSITIONING METHOD

(71) Applicant: ENABLER LTD., Tokyo (JP)

(72) Inventors: Hideyuki Torimoto, Tokyo (JP); Masahiro Asako, Tokyo (JP); Takahiro Shinohara, Tokyo (JP); Masumi Hirota, Tokyo (JP)

( * ) Notice: Subject to any disclaimer, the term of this patent is extended or adjusted under 35 U.S.C. 154(b) by 692 days.

(21) Appl. No.: 17/052,820

(22) PCT Filed: May 22, 2019

(86) PCT No.: PCT/JP2019/020263
§ 371 (c)(1),
(2) Date: Nov. 4, 2020

(87) PCT Pub. No.: WO2019/225646
PCT Pub. Date: Nov. 28, 2019

(65) Prior Publication Data
US 2021/0231814 A1    Jul. 29, 2021

(30) Foreign Application Priority Data

May 24, 2018    (JP) .................................. 2018-099550

(51) Int. Cl.
*G01S 19/12*    (2010.01)
*H04W 16/32*    (2009.01)
(Continued)

(52) U.S. Cl.
CPC .............. *G01S 19/12* (2013.01); *H04W 16/32* (2013.01); *H04W 64/00* (2013.01); *G01S 19/04* (2013.01); *G01S 19/071* (2019.08)

(58) Field of Classification Search
CPC ........ G01S 19/12; H04W 16/32; H04W 64/00
(Continued)

(56) References Cited

U.S. PATENT DOCUMENTS 9,871,570 B1 *  1/2018  Kerhuel .............. H04B 7/0617
2007/0057839 A1   3/2007  Kagawa
(Continued)

FOREIGN PATENT DOCUMENTS

CN    102857911 B    7/2015
CN    105959944 A *  9/2016   ........... H04W 12/02
(Continued)

OTHER PUBLICATIONS

Official Communication issued in corresponding European Patent Application No. 19806672.2, dated May 28, 2021.
(Continued)

*Primary Examiner* — Harry K Liu
(74) *Attorney, Agent, or Firm* — Keating & Bennett, LLP

(57) ABSTRACT

To provide a positioning technology capable of measuring a position of a moving object moving at high speed with high reliability, high accuracy, and high speed. The positioning system 1000 can obtain accurate position data using the positioning information collected from a plurality of base stations, and deliver the obtained accurate position data to the base station. In the positioning system 1000, the base station serving as the position reference station can always hold the accurate position data based on the accurate measurement result data. In the positioning system 1000, the base station whose accurate position is known is used as a position reference station to perform RTK positioning with, for example, the mobile station, thus allowing the position of the mobile station to be measured with high accuracy. Furthermore, in the positioning system, for example, the base station serving as the position reference station for RTK positioning can be switched together with the communication handover, thus allowing highly accurate positioning to be always performed even when the mobile station moves at high speed.

9 Claims, 16 Drawing Sheets

(51) Int. Cl.
*H04W 64/00* (2009.01)
*G01S 19/04* (2010.01)
*G01S 19/07* (2010.01)

(58) Field of Classification Search
USPC .................................................. 342/357.23
See application file for complete search history.

(56) References Cited

U.S. PATENT DOCUMENTS

| | | |
|---|---|---|
| 2009/0121927 A1 | 5/2009 | Moshfeghi |
| 2013/0293412 A1 | 11/2013 | Appleford et al. |
| 2016/0380779 A1 | 12/2016 | Sharma et al. |
| 2017/0245186 A1 | 8/2017 | Sakurai et al. |
| 2017/0336512 A1 | 11/2017 | Kadelka et al. |
| 2018/0246220 A1 | 8/2018 | Zhang et al. |
| 2020/0021452 A1 | 1/2020 | Sharma et al. |

FOREIGN PATENT DOCUMENTS

| | | | |
|---|---|---|---|
| EP | 3 246 730 A1 | 11/2017 | |
| JP | 2005-164395 A | 6/2005 | |
| JP | 2005-315644 A | 11/2005 | |
| JP | 2007-162223 A | 6/2007 | |
| JP | 2016-127444 A | 7/2016 | |
| JP | 2017-510162 A | 4/2017 | |
| JP | 2017-211892 A | 11/2017 | |
| TW | 201034490 A1 | 9/2010 | |
| WO | 2017/071650 A1 | 5/2017 | |
| WO | WO-2021181141 A1 * | 9/2021 | ............ H04W 16/18 |

OTHER PUBLICATIONS

Official Communication issued in corresponding Taiwanese Patent Application No. 108117932, dated Dec. 6, 2022.
Official Communication issued in International Patent Application No. PCT/JP2019/020263, dated Aug. 20, 2019.

\* cited by examiner

POSITIONING SYSTEM, BASE STATION, AND POSITIONING METHOD

TECHNICAL FIELD

The present invention relates to positioning technology using positioning satellites.

BACKGROUND ART

Recently, unmanned control systems for automobiles have been developed worldwide, and they essentially require satellite positioning for obtaining position information. A system for performing this satellite positioning (satellite positioning system) is being developed in the United States, Russia, EU, China, Japan, India, and the like. All of these are developed based on the world unified world coordinate system, and positioning results are calculated based on the same geocentric coordinates everywhere on the earth. On the other hand, automobiles with advanced unmanned technology are now world-class products, and achieve a certain level of high-accuracy positioning even when moving at high speed in a wide areas all over the world; it is essential that a highly accurate solution be instantaneously provided even when satellite acquisition is interrupted and reacquired, and that reliable sub-centimeter accuracy can be maintained no matter where the automobiles are moved. In addition, when implementing these in the target area or country, it is absolutely necessary to have a communication function that can reliably supply accuracy correction data to a moving object moving at high speed in a wide area. In Japan, the coordinates of more than 1,200 GPS (Global Positioning System) electronic reference points of Geospatial Information Authority of Japan are measured; based on the measured coordinates of the GPS electronic reference points of Geospatial Information Authority of Japan, a map of Japan (static map) has been created, and a highly accurate digital map has been realized.

Such an electronic reference point is a facility for continuously observing radio waves from GPS satellites with equipment fixed on the ground. The whole GPS continuous observation system consisting of electronic control points all over the country and an analysis calculation device (installed at the head office of Geospatial Information Authority of Japan) is called GEONET (GPS Earth Observation Network System). This system has made it possible to monitor the crustal movements of Japan, which is progressing from moment to moment, almost uniformly throughout the country.

However, in recent years, there is a demand for positioning that requires ultra-high accuracy and higher real-time property for applications such as autonomous driving or the like.

For example, a GPS electronic reference points of the Geospatial Information Authority of Japan is constantly moving due to crustal movements or the like, and thus there exists a certain amount of error between a value published as the coordinates of the GPS electronic reference point and a GPS electronic reference point accurately measured in real time.

For applications requiring ultra-high accuracy and real-time performance, the above-mentioned error cannot be ignored and must be taken into consideration. Accordingly, there has been demands for a technology of accurately specifying the current accurate position of a moving object on the map with extremely high accuracy (an error of 10 cm or less, preferably an error of a few cm or less) or a positioning technology that obtains the coordinate data of the moving object at the current time with extremely high accuracy.

In other words, as described above, research and development of autonomous vehicles have been actively conducted in recent years; in order to achieve automatic driving at high speed in a wide area, it is necessary that the position of the traveling vehicle and the position outputted from the satellite positioning system are matched with each other, and then the position of the traveling vehicle is measured with high accuracy and stability. For this reason, there is a demand for a positioning technology that identifies the position of a moving object, with high-reliability and high-accuracy, at high speed (in real time). In addition, autonomous vehicles need to be commonly used in the world, and thus it is preferable that the high-reliability, high-accuracy, and high-speed positioning technology described above is realized under a globally unified standard.

Thus, in identifying the position of such a moving object, it is desirable to use the Global Geodetic Reference Frame (GGRF).

The shape of the earth is not a perfect sphere, and its shape and rotation are changing little by little. To accurately measure latitude and longitude on the earth that has such a complicate shape and is constantly changing, it is necessary to constantly measure accurate positions at various places on the earth and to know the exact shape of the earth and its changes.

In conventional maps, different geocentric coordinates are used for each country; it is difficult to accurately measure positions on a global scale based on different standards that each country has independently employed. For autonomous driving, services only available in specific countries are not desirable, and thus, it is necessary to adopt a "world geodetic coordinate system" with the center of gravity of the earth as the origin.

In addition, in recent years, development for the fifth-generation mobile communication system (5G) has been advanced. In the fifth-generation mobile communication system, in order to secure a high communication speed, the base stations need to be installed at high density, as compared with the prior system, to ensure high-speed communication. Thus, for example, the fifth-generation mobile communication system is going to employ, as a structure for base stations, a heterogeneous network in which micro cells each including a base station that has high transmission power and transmits/receives control signals or the like and small cells each including a base station that has low transmission power but transmits/receives data at high speed are deployed in a mixed manner (e.g., see Patent Document 1).

On the other hand, to obtain accurate time information in an outdoor base station, a GPS receiver installed in the base station obtains time information of positioning satellites.

PRIOR ART DOCUMENTS

Patent Document 1: JP2016-127444

DISCLOSURE OF INVENTION

Technical Problem

To achieve an application that requires high accuracy and real-time performance (for example, an application for achieving an autonomous vehicle), it is necessary to establish a technology that measures a current position of an object (a moving object) with high accuracy even when the object moves at high speed.

To establish such a technology, it is necessary to achieve a technique for measuring, uniformly in a wide area, the position of an arbitrary point with high reliability, with high accuracy, and at high speed.

To solve the above problems, it is an object of the present invention to provide a positioning technique that measures the position of a moving object that moves at high speed with high reliability, with high accuracy, and at high speed even when the moving object moves at high speed. Another object of the present invention is to achieve a communication function that surely supplies correction data with reliable accuracy to a moving object that moves in a wide area at high speed.

Solution to Problem

To solve the above problems, a first aspect of the present invention provides a positioning system including a plurality of first base stations, a mobile station, a management station for controlling handover between the first base stations, and a base station position calculation system.

The first base station includes a first receiving device that receives positioning signals transmitted from a plurality of positioning satellites as first positioning signals, is set as a position reference station for position measurement, and serves as a base station of a mobile phone network, The mobile station includes a second receiving device that receives positioning signals transmitted from a plurality of positioning satellites as second positioning signals.

The management station controls switching of the first base station, which serves as the position reference station, in conjunction with handover for communication of the mobile telephone network.

The first receiving device of the first base station transmits, as first positioning information, positioning information that is obtained from the first positioning signal and includes at least a carrier phase integrated value and a pseudo range to the base station position calculation system. The first base station includes a communication interface for transmitting information for correcting an error in positioning based on the second positioning signal to the mobile station as correction information along with station position information of the first base station.

The mobile station includes a position calculation unit that performs mobile station position calculation processing that calculates a mobile station position, which is a position of the mobile station, using a real-time kinematic method, based on the carrier phase integrated value derived from the second positioning signal and the carrier phase integrated value derived from the station position information of the first base station transmitted from the first base station and the first positioning signal.

The base station position calculation system includes:
a receiving unit that collects the first positioning information transmitted from each of the plurality of first base stations;
a coordinate calculation unit that calculates a position of the first base station in the world geodetic coordinate system based on the first positioning information collected within a predetermined time and obtains the calculated position as accurate position information; and
a transmission unit that transmits the accurate position information of each of the plurality of first base stations, which is calculated by the coordinate calculation unit, to the corresponding first base station.

This positioning system makes it possible to obtain accurate position data using the positioning information collected from the plurality of first base stations and deliver the obtained accurate position data to the first base station. In this positioning system, the first base station serving as the position reference station can always hold the accurate position data based on the accurate measurement result data. In this positioning system, the first base station whose accurate position is known is used as the position reference station to perform RTK positioning with the mobile station, thus allowing the position of the mobile station to be measured with high accuracy. Further, in this positioning system, the base station serving as the position reference station for RTK positioning can be switched together with the communication handover, thus allowing high accurate positioning to be always performed even when the mobile station moves at high speed. As a method of calculating the position of the first base station in the world geodetic coordinate system based on the first positioning information collected within a predetermined time in the coordinate calculation unit of the base station position calculation system, for example, the following calculation method may be used. A calculation method in which using the observation data of the IGS points around the first base station (target point) and the ITRF coordinate values, the coordinate values of each positioning reference point are accurately determined using static GNSS analysis software may be used. Note that as the static GNSS analysis software, for example, software such as GAMIT of Massachusetts Institute of Technology and Bernese of Bern University can be used. The wording "in conjunction with handover for the communication of the mobile phone network" includes the concept of "with the handover of the communication of the mobile phone network". Thus, for example, the management station may control the switching of the first base station serving as the position reference station, triggered by the handover for the communication of the mobile phone network.

A second aspect of the present invention provides the positioning system of the first aspect of the present invention in which the base station position calculation system transmits error information, which is information about a difference between a public coordinate system generated based on electronic reference points and not updated for a predetermined period, and a world geodetic coordinate system generated based on position information obtained by accurate position measurement, to the first base station.

This enables displaying the mobile station at an appropriate position on the static map, for example. In other words, when it is displayed on a map (static map) created based on the static digital map, the position of the mobile station is displayed with a deviation because the static map has an error between the correct position and the displayed position on the map. To prevent this, the positioning system transmits error information between the static digital map and the precision digital map (digital map created by precision measurement results) to the mobile station, the mobile station corrects (changes) the position using the error information, thereby allowing the mobile station to be displayed at an appropriate position on the static map.

A third aspect of the invention provides the positioning system of the first or second aspect of the invention in which when the handover of communication of the mobile telephone network in which communication connection is switched from a handover source base station that is one of the first base stations to a handover destination base station that is another of the first base stations has been performed, the mobile station performs the mobile station position calculation processing based on (1) the carrier phase integrated value derived from the second positioning signal and (2) the carrier phase integrated value derived from the station position information of the first base station transmitted from the handover destination base station and the first positioning signal.

This positioning system allows the switching source base station and the switching destination base station of the communication handover to be respectively matched with the switching source base station and the switching destination base station of the position reference station for the positioning process.

A fourth aspect of the invention provides the positioning system of the first or second aspect of the invention in which when the handover of communication of the mobile telephone network in which communication connection is switched from a handover source base station that is one of the first base stations to a handover destination base station that is another of the first base stations has been performed, the mobile station performs the mobile station position calculation processing based on (1) the carrier phase integrated value derived from the second positioning signal and (2) the carrier phase integrated value derived from the station position information of the first base station transmitted from a positioning switch destination base station that is a first base station different from the handover destination base station and that is within a predetermined distance from the mobile station and the first positioning signal.

This positioning system allows highly accurate positioning processing to be performed even when the switching source base station and the switching destination base station of the communication handover do not respectively match the switching source base station and the switching destination base station of the position reference station of the positioning processing. In other words this positioning system allows highly accurate positioning processing to be performed even when the switching source base station and the switching destination base station for the communication handover do not match the switching source base station and the switching destination base station of the position reference station for positioning processing.

A fifth aspect of the invention provides the positioning system of one of the first to the fourth aspects of the invention including:

a small cell base station having a small cell, which is an area of a first size, as a communicable area;

a first macro cell base station that has a macro cell, which is an area larger than the small cell, as a communicable area and that has a GNSS reception function of receiving radio waves transmitted from GNSS satellites and obtains GNSS data from the radio waves; and a mobile station having a GNSS reception function of obtaining GNSS data from the radio wave.

The macro cell base station transmits positioning data that is data obtained from the GNSS data by the macro cell base station and that is used for positioning with GNSS satellites to the small cell base station in a small cell in which the mobile station exists as user plane data addressed to the mobile station, the user plane data being data used for communication processing in small cells using user planes.

The small cell base station transmits the user plane data including the positioning data received from the macro cell base station to the mobile station.

The mobile station obtains the positioning data from the user plane data from the small cell base station, and performs positioning of the mobile station using the obtained positioning data and the GNSS data obtained from the radio waves received by the mobile station from the GNSS satellites.

This positioning system allows the data necessary for positioning (for example, RTK positioning) to be transmitted from the macro cell base station, which is the position reference station, to the mobile station using the user plane data. As a result, in a system capable of high-speed wireless communication, using a mechanism originally used in high-speed wireless communication allows data necessary for positioning (for example, RTK positioning) to be transmitted to, for example, a mobile station moving at high speed. Thus, this positioning wireless communication system makes it possible to perform high-speed and highly accurate positioning even for a mobile station moving at high speed.

A sixth aspect of the invention provides the positioning system of the fifth aspect of the invention, further including a second macro cell base station that has a macro cell, which is an area larger than the small cell, as a communicable area and that has a GNSS reception function of receiving radio waves transmitted from GNSS satellites and obtains GNSS data from the radio waves.

When (A) the mobile station moves from a first macro cell that is a macro cell of the first macro cell base station to a second macro cell that is a macro cell of the second macro cell base station, (B) handover processing in which a source of control plane data for performing control using the macro cell is handed over from the first macro cell base station to the second macro cell base station is performed, and (C) a process of changing a transmission source of the positioning data transmitted from the macro cell base station for positioning the mobile station to the mobile station from the first macro cell base station to the second macro cell base station is performed.

After the above process is performed, the second macro cell base station transmits the positioning data obtained by the second macro cell base station to the small cell base station of the small cell in which the mobile station exists as user plane data addressed to the mobile station.

The small cell base station transmits the user plane data including the positioning data received from the macro cell base station to the mobile station, The mobile station obtains the positioning data from the user plane data transmitted from the second macro cell base station via the small cell base station, and performs positioning of the mobile station using the obtained positioning data and the GNSS data obtained from radio waves received by the mobile station from the GNSS satellites.

In this positioning wireless communication system, even when the mobile station moves at a high speed from the first macro cell to the second macro cell, in performing handover processing, the position reference station from which data necessary for positioning (e.g., RTK positioning) is obtained is changed from the micro cell base station with which communication connection has been established before handover processing to the micro cell base station to which communication connection is to be switched by handover processing. Thus, in the positioning wireless communication system, even when the mobile station moves at a high speed from the first macro cell macro_ to the second macro cell macro, data necessary for positioning (e.g., RTK positioning) is always obtained as U-plane data from the position reference station (macro cell base station) capable of performing highly accurate positioning (e.g., RTK positioning).

A seventh aspect of the invention provides the positioning system of the fifth aspect of the invention, further including second to N-th macro cell base stations that each have a macro cell, which is an area larger than the small cell, as a communicable area and that each have a GNSS reception function of receiving radio waves transmitted from GNSS satellites and obtains GNSS data from the radio waves.

When (A) the mobile station moves from a first macro cell that is a macro cell of the first macro cell base station to a second macro cell that is a macro cell of the second macro cell base station, (B) handover processing in which a source of control plane data for performing control using the macro cell is handed over from the first macro cell base station to the second macro cell base station is performed, and (C) the number of the GNSS satellites whose radio waves can be received in common by the mobile station and the second macro cell base station is less than a predetermined number, a process of changing a transmission source of the positioning data transmitted from the macro cell base station for positioning the mobile station to the mobile station from the first macro cell base station to a macro cell base station that is different from the second macro cell base station and in which the number of GNSS satellites that can be received in common with the mobile station is larger than a predetermined number is performed.

When the mobile station moves at a high speed from the first macro cell to the second macro cell, positioning (e.g., RTK positioning) is performed with a macro cell base station to which communication connection is to be switched by handover processing as the position reference station, and it is determined that high-accuracy and high-speed RTK positioning cannot be performed, this positioning system searches a macro cell base station that is guaranteed to perform high-accuracy and high-speed positioning (e.g., RTK positioning). In this positioning wireless communication system, the macro cell base station that is guaranteed to perform high-accuracy and high-speed positioning (e.g., RTK positioning) is used as the position reference station, and then the mobile station performs positioning (e.g., RTK positioning), thereby allowing high-accuracy and high speed RTK positioning to be performed stably.

A eighth aspect of the present invention provides the positioning system of one of the fifth to seventh aspects of the present invention, including a plurality of macro cell base stations that each have a GNSS receiving function of receiving radio waves transmitted from GNSS satellites and each obtain GNSS data from the radio waves. Among the plurality of macro cell base stations, at least one set of macro cell base stations is arranged such that their mutual distance is equal to or less than a predetermined distance. Note that the "predetermined distance" is, for example, 10 km. The "predetermined distance" may be, for example, an arbitrary distance in the range of 10 km to 50 km.

In this positioning wireless communication system, the macro cell base station serving as the position reference station is arranged so that the distance from the adjacent macro cell base station is 10 km or less; for example, it is guaranteed that the base line length of RTK positioning is 10 km or less. Thus, when the number of GNSS satellites whose GNSS signal can be received is a predetermined number (for example, 13 or more), the position of the unknown point can be instantly calculated. Accordingly, even if the mobile station is moving at high speed, the position of the mobile station can be specified with high accuracy and high speed by highly accurate positioning (for example, RTK positioning).

A ninth aspect of the present invention provides a base station used in a wireless communication system for communicating with a mobile station, including a GNSS antenna, a GNSS receiving unit, a control plane signal processing unit, and a user plane signal processing unit.

The GNSS antenna receives radio waves transmitted from a GNSS satellite.

The GNSS receiving unit performs reception processing on radio waves received by the GNSS antenna to obtain data transmitted from the GNSS satellites.

The control plane signal processing unit performs processing for performing communication using control planes in a macro cell.

The user plane signal processing unit performs processing for user plane communication in a small cell. Also, the user plane signal processing unit performs processing for including data necessary for positioning processing performed using radio waves from GNSS satellites in the mobile station into data for communication using the user plane.

This achieves a base station that transmits data necessary for positioning (for example, RTK positioning) to the mobile station using the user plane data.

A tenth aspect of the present invention provides the base station of ninth aspect of the present invention further including a time information obtaining unit and a timing control unit.

The time information obtaining unit that obtains time information from data obtained by the GNSS receiving unit.

The timing control unit that performs timing control of communication performed in the wireless communication system based on the time information.

This achieves a synchronization process or the like used for wireless communication by using highly accurate time information from the GNSS satellite and highly accurate timing in the base station. As a result, higher speed and highly accurate communication can be achieved.

A eleventh aspect of the present invention provides a positioning method used in a wireless communication system that communicates with a mobile station having a GNSS receiving function by using a small cell base station whose communicable area is a small cell having an area of a first size and a macro cell base station whose communicable area is a macro cell having an area larger than the small cell, the macro cell base station having a GNSS receiving function that receives radio waves transmitted from GNSS satellites and obtains GNSS data from the radio waves. The positioning method includes a first transmission step, a second transmission step, and a positioning step.

The first transmission step transmits positioning data that is data obtained from the GNSS data by the macro cell base station and that is used for positioning with GNSS satellites to the small cell base station in a small cell in which the mobile station exists as user plane data that is data used for communication processing in the small cell using user planes.

The second transmitting step transmits the positioning data received by the small cell base station from the small cell base station to the mobile station.

The positioning step measures a position of the mobile station using the positioning data received from the small cell base station and the GNSS data obtained from the radio waves received by the mobile station from the GNSS satellites.

This positioning method allows data necessary for positioning (for example, RTK positioning) to be transmitted from the macro cell base station, which is the position reference station, to the mobile station using the user plane data. As a result, in a system capable of high-speed wireless communication, using a mechanism originally used in high-speed wireless communication allows data necessary for positioning (e.g., RTK positioning) to be transmitted to, for example, a mobile station moving at high speed. Thus, this positioning method allows high-speed and highly accurate positioning to be performed even for a mobile station moving at high speed.

Advantageous Effects

The present invention provides a positioning technique that measures the position of a moving object that moves at high speed with high reliability, with high accuracy, and at high speed even when the moving object moves at high speed.

DESCRIPTION OF THE PREFERRED EMBODIMENTS

First Embodiment

A first embodiment will be described below with reference to the drawings.

Figure 1:
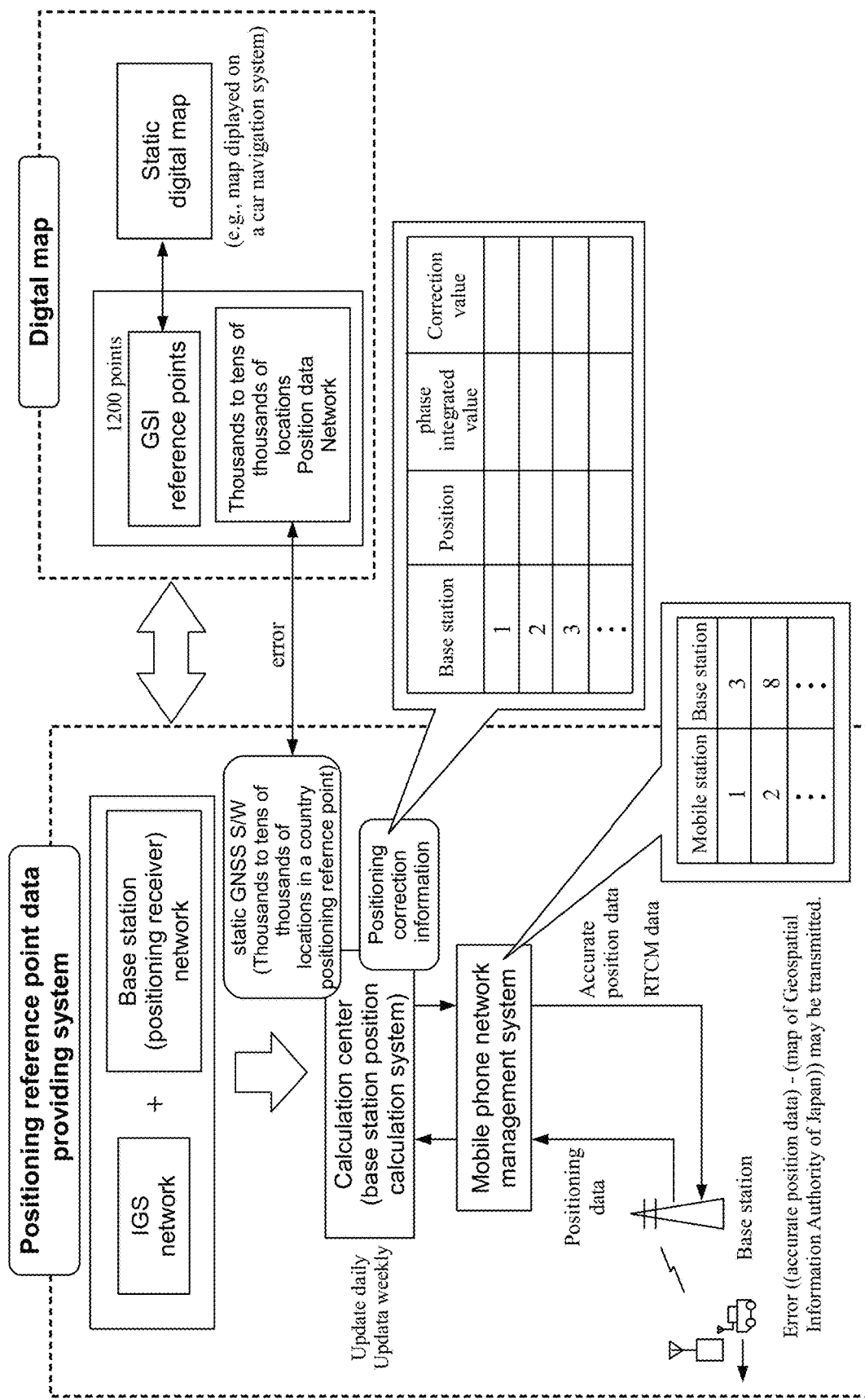
FIG. 1 is a conceptual diagram for explaining a configuration of a positioning reference point data providing system according to a first embodiment.

FIG. 1 is a conceptual diagram for explaining a configuration of a positioning reference point data providing system according to the present embodiment.

The positioning reference point data providing system of the present embodiment can be operated in any country in the world, but a case of operating in Japan will be described as an example in the following. Currently, the Geospatial Information Authority of Japan participates in the International GNSS Service (IGS) and is making an analysis to provide observation data necessary for providing precise orbit information (precision calendar) and to acquire the International Terrestrial Reference Frame (ITRF).

Here, the purpose of IGS is to provide researchers all over the world with information of GPS, GLONASS, Galileo, or the like in cooperation with related organizations in each country in order to support research activities such as geodesy and geophysics, or the like. For example, the following projects are being implemented.

(1) Build a network of tracking stations for GNSS around the world and perform continuous observation.
(2) Observation data is centrally managed and provided by a data center.
(3) An analysis center generates and provides a precise ephemeris, earth rotation parameters, the coordinates and speed of an IGS station, or the like from the above observation data.

Referring to FIG. 1, in the positioning reference point data providing system of the present embodiment, firstly, GNSS reception data is collected in real time in a calculation center, the GNSS reception data is obtained from a positioning reference point network including (1) a plurality of IGS positioning reference points that provide reference points for positioning among the IGS reference points constructed internationally as described above and (2) reference points with positioning receivers installed in predetermined base stations in a mobile phone network as described later.

Here, the GNSS reception data from the positioning reference point network is, for example, data sampled every 30 seconds for 24 hours; the GNSS reception data is pseudo range data, a carrier phase integrated value, time data or the like for each positioning satellite observed at each reference point.

In the calculation center, coordinate values of each positioning reference point are accurately determined, using static GNSS analysis software, with observation data of IGS points surrounding the position reference point and ITRF coordinate values. Here, examples of the static GNSS analysis software to be used include software such as GAMIT of Massachusetts Institute of Technology and Bernese of Bern University.

In Japan, about 30 IGS points in the East Asia, Central Asia, Siberia, North America, and Pacific regions can be used for the time being. As the ITRF coordinate system, for example, the ITRF2014 coordinate reference system can be used. Using these coordinate systems allows coordinates of the positioning position reference points to be specified with the above-mentioned world geodetic coordinate system.

For example, the following document also discloses a method of accurately determining positions of positioning reference points using such static GNSS analysis software.

Known document: Japanese Patent No. 4846779

Using such static GNSS analysis software makes it possible to timely specify a predetermined number of base stations in the positioning reference point network; for example, the base stations can be specified at thousands to tens of thousands of locations in Japan. Performing such processing in the calculation center allows the coordinates of the predetermined number of base stations in the world geodetic coordinate system to be determined every day.

On the other hand, the calculation center collects the information such as the carrier phase integrated value measured at the base station at a predetermined interval from a predetermined mobile phone base station in the positioning reference point network.

As a result, the calculation center accumulates position information of each base station accurately determined at the closest time and information of the carrier phase integrated value collected at a predetermined timing, as positioning correction information for each base station. The calculation center transmits the positioning correction information thus accumulated to a mobile phone network management system.

The mobile phone network management system holds information (mobile station ID) for identifying a mobile station in association with information for identifying a base station with which the mobile station is currently communicating.

As a result, as will be described later, when a mobile station performs real-time kinematic (RTK) positioning, a base station communicating with the mobile station transmits information on the latest accurately determined position of the base station and information on a carrier phase integrated value as positioning correction information, for example, in the RTCM format.

The mobile station calculates a double phase difference based on the positioning signals from the positioning satellites measured by itself and the positioning correction information received from the base station to perform RTK positioning, thereby determining its current position with high accuracy.

A method of position measurement based on such a double phase difference is, for example, the following processing.

The carrier phase data observed by a receiver is integrated data in units of wave number, assuming that the frequency of the radio wave transmitted from the satellite is L1, the carrier phase data (carrier integrated value) $\Phi_{L1}$ is expressed as follows.

$$\Phi_{L1} = \lambda_{L1}^{-1}[r - I_{L1} + T] + f_{L1}(\delta_{tu} - \delta t^s) + N_{L1} + \varepsilon_{\varphi, L1}$$

$\lambda_{L1}$: wavelength of a carrier L1
r: geometric distance between a receiver and a satellite
$I_{L1}$: ionospheric delay
T: tropospheric delay
$f_{L1}$: frequency of the carrier L1
$\delta t_u$: receiver clock error
$\delta t^s$: satellite clock error
$N_{L1}$: integer bias
$\varepsilon_{\varphi, L1}$: station-dependent error (error due to multipath, receiver noise, or the like.)

Figure 2:
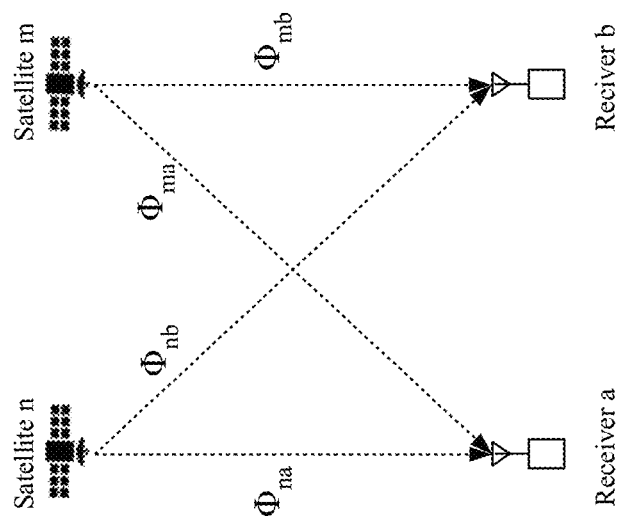
FIG. 2 is a diagram for explaining a position measuring method using a double phase difference.

As shown in FIG. 2, when two receivers a and b obtain carrier phase data from an n-th satellite and an m-th satellite at a certain time, assuming that carrier integrated values of the two satellites at the receiver a are $\Phi_{na}$ and $\Phi_{ma}$, and carrier integrated values of the two satellites at the receiver $\Phi_{nb}$ are $\Phi_{nb}$ and $\Phi_{mb}$, a double phase difference $DD\Phi_{mab}$ is $$DD\varphi_{nmab} = (\Phi_{mb} - \Phi_{nb}) - (\Phi_{ma} - \varphi_{na}) =$$

$$\lambda^{-1}[DDr_{nmab} - DDI_{nmab} + DDT_{nmab}] + DDN_{nmab} + DD\varepsilon_{nmab}$$

Therefore, the receiver clock error and the satellite clock error are completely removed. Note that DDx represents a double phase difference for x. Furthermore, when a distance (baseline) between the receiver a and the receiver b is short, the terms of the ionosphere and the troposphere are canceled out. Therefore, when the baseline is short, the double phase difference can be expressed as follows:

$$DD\Phi_{nmab} = \lambda^{-1} \times DDr_{nmab} + DDN_{nmab} + DD\varepsilon_{nmab}$$

Assuming that the receiver a is a reference station whose position is known, the receiver b is a mobile station whose position is unknown, and a transmission frequency from each satellite is equal, a double phase difference for an epoch t is $$DD\Phi_{nmab}(t) = \lambda^{-1}[r_{mb}(t) - r_{ma}(t)] - \lambda^{-1}[r_{nb}(t) - r_{na}(t)] + DDN_{nmab}(t)$$

$$DD\Phi_{nmab}(t) + \lambda^{-1}[r_{ma}(t) - r_{na}(t)] = \lambda^{-1}[r_{mb}(t) - r_{nb}(t)] + DDN_{nmab}(t)$$

$DDN_{nmab}$ is known. Since the position of the receiver a and the positions of the satellites m and n are known, $r_{ma}(t)$ and $r_{na}(t)$ can be calculated by the Pythagorean theorem. The unknowns are the position $(x_b(t), y_b(t), z_b(t))$ of the receiver b and the integer bias term $DDN_{nmab}(t)$.

The above equations are used to define simultaneous equations. Assuming that the number of satellites used for positioning is i and the number of reference satellites is one, it is possible to derive i−1 independent simultaneous equations for the epoch t as follows.

Simultaneous equations for the epoch t:

$$DD\Phi_{12ab}(t) + \lambda^{-1}[r_{2a}(t) - r_{1a}(t)] = [r_{2b}(t) - r_{1b}(t)] + DDN_{12ab}(t)$$

$$DD\Phi_{13ab}(t) + \lambda^{-1}[r_{3a}(t) - r_{1a}(t)] \times [r_{3b}(t) - r_{1b}(t)] + DDN_{13ab}(t)$$

$$DD\Phi_{14ab}(t) + \lambda^{-1}[r_{4a}(t) - r_{1a}(t)] \div [r_{4b}(t) - r_{1b}(t)] + DDN_{14ab}(t)$$

. . .

$$DD\Phi_{1iab}(t) + \lambda^{-1}[r_{ia}(t) - r_{1a}(t)] = [r_{ib}(t) - r_{1b}(t)] + DDN_{1iab}(t)$$

In the above i−1 simultaneous equations, (i−1) pieces of DDN(t) and the position $(x_b(t), y_b(t), z_b(t))$ of the receiver b are unknowns, and the number of unknowns is (i+2) in total; thus, the solution cannot be found only by the above i−1 simultaneous equations.

To address this, using the property that integer value biases are constant unless a cycle trip occurs, similar simultaneous equation is derived for an epoch (t+1) as follows.

Simultaneous equations for the epoch (t+1):

$$DD\Phi_{12ab}(t+1) + \lambda^{-1}[r_{2a}(t+1) - r_{1a}(t+1)] = [r_{2b}(t+1) - r_{1b}(t+1)] + DDN_{12ab}(t)$$

$$DD\Phi_{13ab}(t+1)+\lambda^{-1}[r_{3a}(t+1)-r_{1a}(t+1)]\times[r_{3b}(t+1)-r_{1b}(t+1)]+DDN_{13ab}(t)$$

$$DD\Phi_{14ab}(t+1)+\lambda^{-1}[r_{4a}(t+1)-r_{1a}(t+1)]\div[r_{4b}(t+1)-r_{1b}(t+1)]+DDN_{14ab}(t)$$

...

$$DD\Phi_{1iab}(t+1)+\lambda^{-1}[r_{ia}(t+1)-r_{1a}(t+1)]=[r_{ib}(t+1)-r_{1b}(t+1)]+DDN_{1iab}(t)$$

In using both the simultaneous equations for the epoch t and the simultaneous equations for the epoch (t+1), there are (i+2) unknowns, and the number of simultaneous equations is (2i−2); thus, all unknowns can be found when i≥4 is satisfied. In other words, when the number of satellites is 4 or more, all unknowns can be found.

However, the integer value bias calculated as described above is not an integer but a real number. Thus, the calculated bias that is a real number must be converted into an integer. The simplest method is to round off, but if the standard deviation of the bias is large, this method cannot find an exact solution. In general, considering the average value and standard deviation of bias, the combination of possible integer values is assumed; then, a residual of the least squares method is calculated, and the combination that minimizes the residual is set to a true integer bias. Fixing the obtained integer bias limits unknowns of the simultaneous equations for epoch (t+1) to only three unknowns, which are $(x_b(t), y_b(t), z_b(t))$, thereby making it easy to find a solution.

Calculating the double phase difference as described above allows RTK positioning to be performed.

On the other hand, digital maps installed and used in moving objects has been basically created in Japan so as to be consistent with the GSI reference points (1200 points in Japan) of the GSI as described above.

However, the coordinates of the GSI reference points (referred to as "map reference positions") at the time of creating the digital maps in this way do not accurately match the position coordinates of these reference points at the time of positioning a moving object. For example, assuming that the position coordinates of the reference points of the positioning reference point network are accurately determined based on the map reference positions, there exists an error between the position coordinates obtained by the above process and the position coordinates of the reference points of the positioning reference point network that are accurately determined daily at the calculation center as described above. To address this, based on the map reference positions and the current coordinate value, each coordinate of the reference points of the positioning reference network is determined using the vector closing technique by the triangulation method or the like. This makes it possible to calculate coordinate values that are consistent with the map reference positions.

The calculation center holds such an error for each base station as a correction value for the digital map. Distributing such a correction value to a moving object allows the moving object to determine which position on the digital map, which the moving object has, the accurate current position of the moving object, which has been specified in the world geodetic coordinate system, corresponds to.

<1.1: Configuration of Positioning Wireless Communication System>

The present embodiment will now be described in more detail; for one example, a case in which the above-described mobile phone network is configured with a communication network including macro cells and small cells will now be described.

Figure 3:
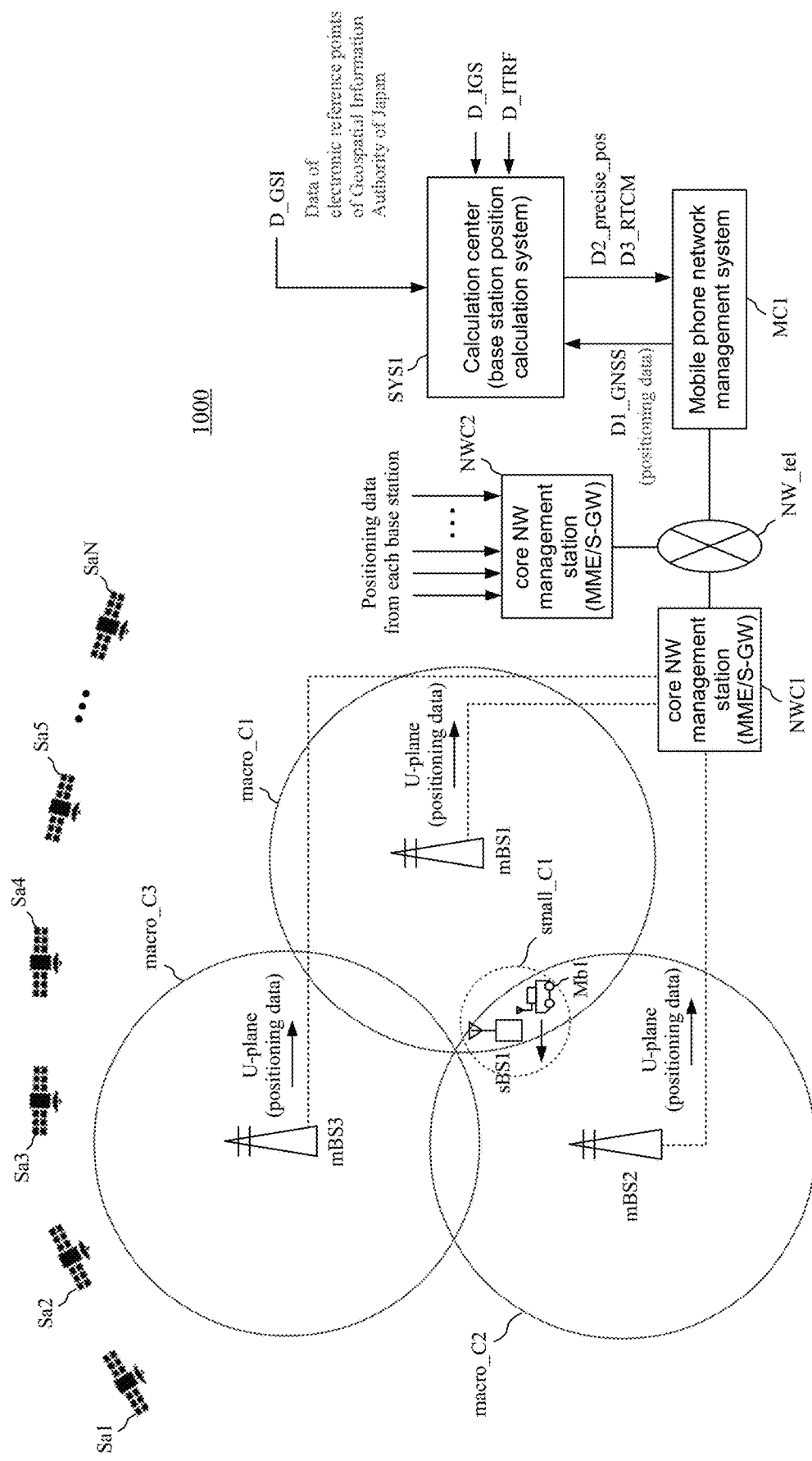
FIG. 3 is a schematic configuration diagram of a positioning wireless communication system 1000 according to the first embodiment.

FIG. 3 is a schematic configuration diagram of a positioning wireless communication system 1000 (an example of a positioning system) according to a first embodiment.

Figure 4:
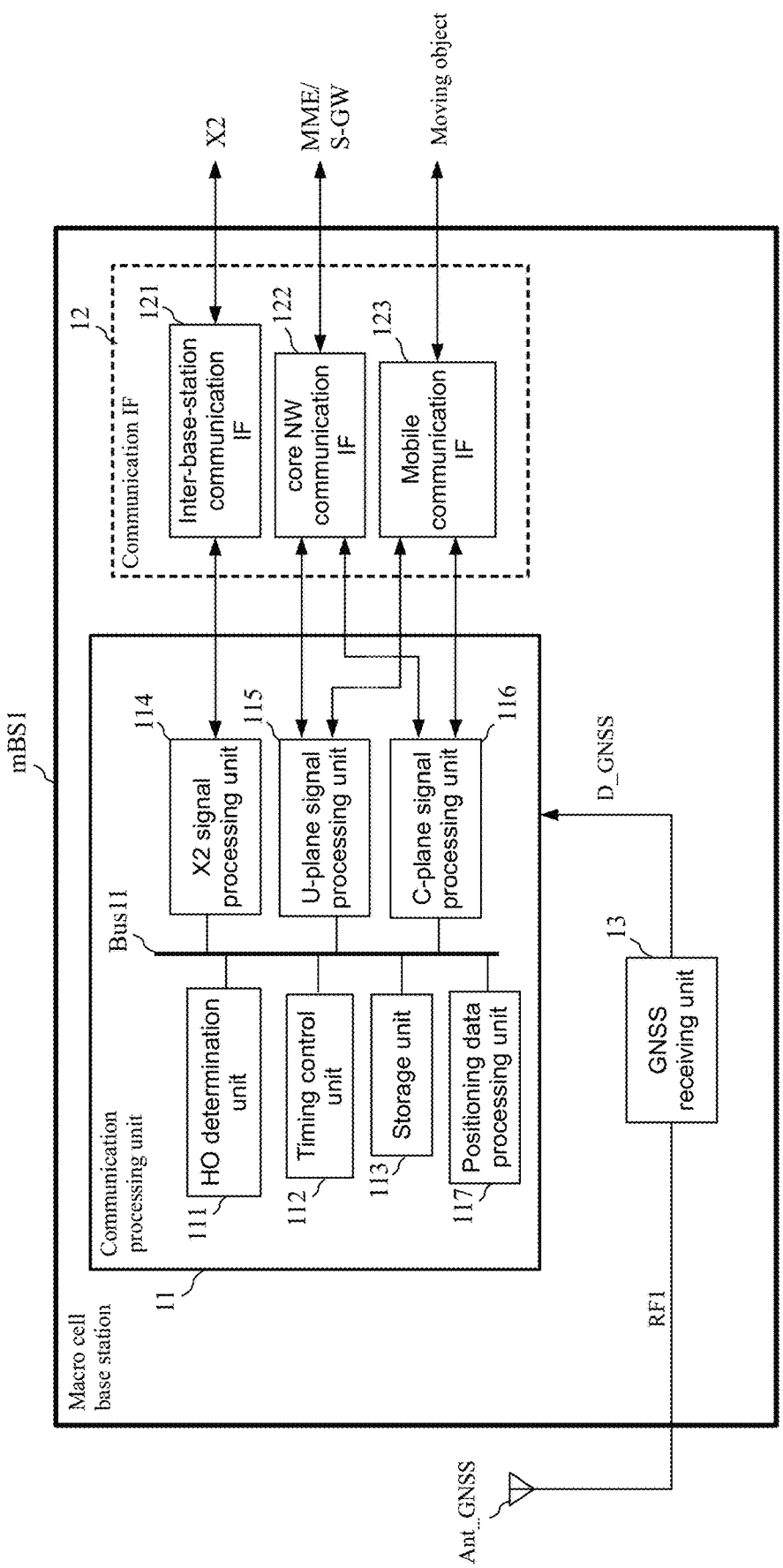
FIG. 4 is a schematic configuration diagram of a macro cell base station mBS1 used in the positioning wireless communication system 1000 according to the first embodiment.

FIG. 4 is a schematic configuration diagram of a macro cell base station mBS1 used in the positioning wireless communication system 1000 of the first embodiment.

Figure 5:
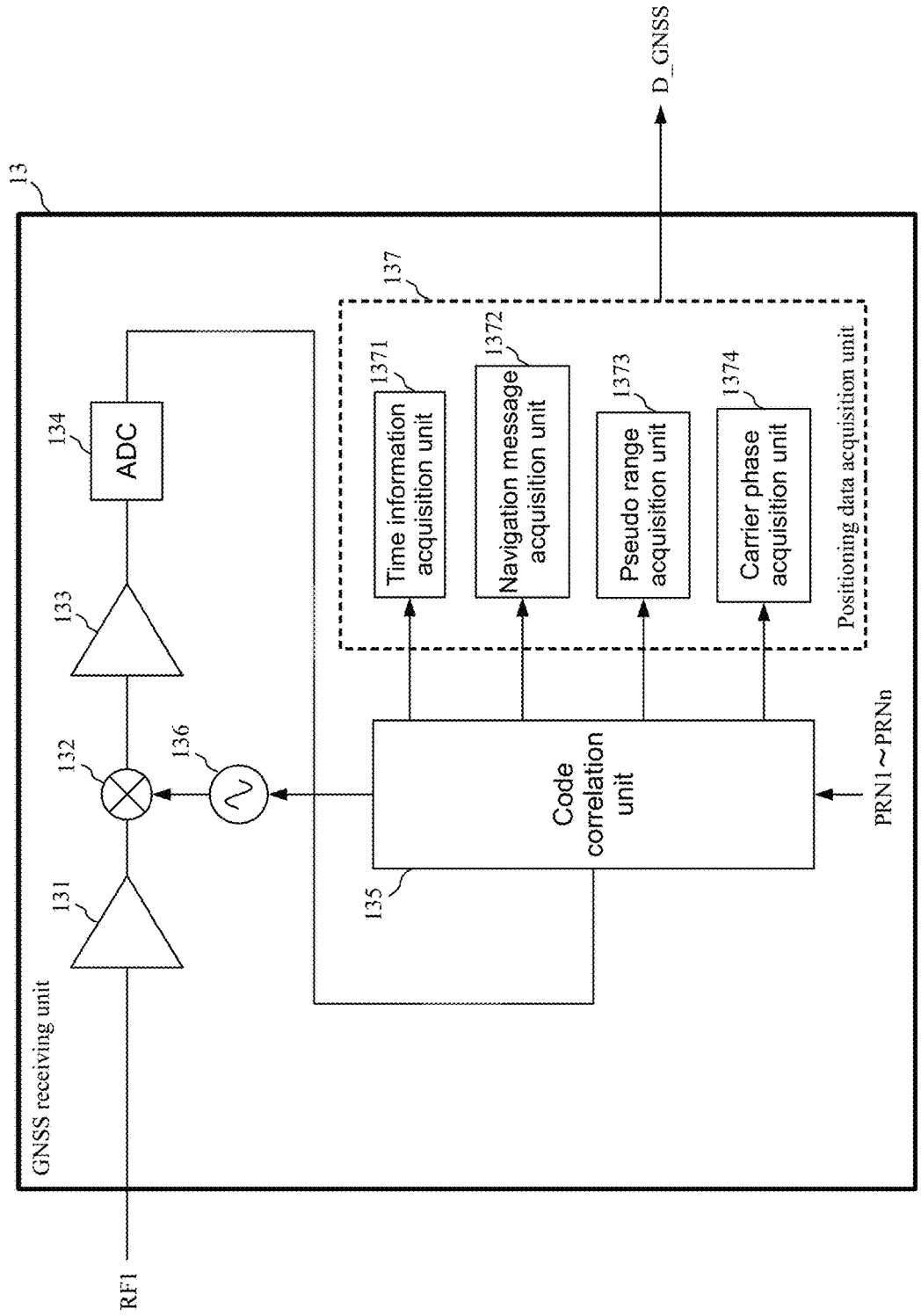
FIG. 5 is a schematic configuration diagram of a GNSS receiving unit 13 of the macro cell base station mBS1 according to the first embodiment.

FIG. 5 is a schematic configuration diagram of a GNSS receiving unit 13 of the macro cell base station mBS1 of the first embodiment.

Figure 6:
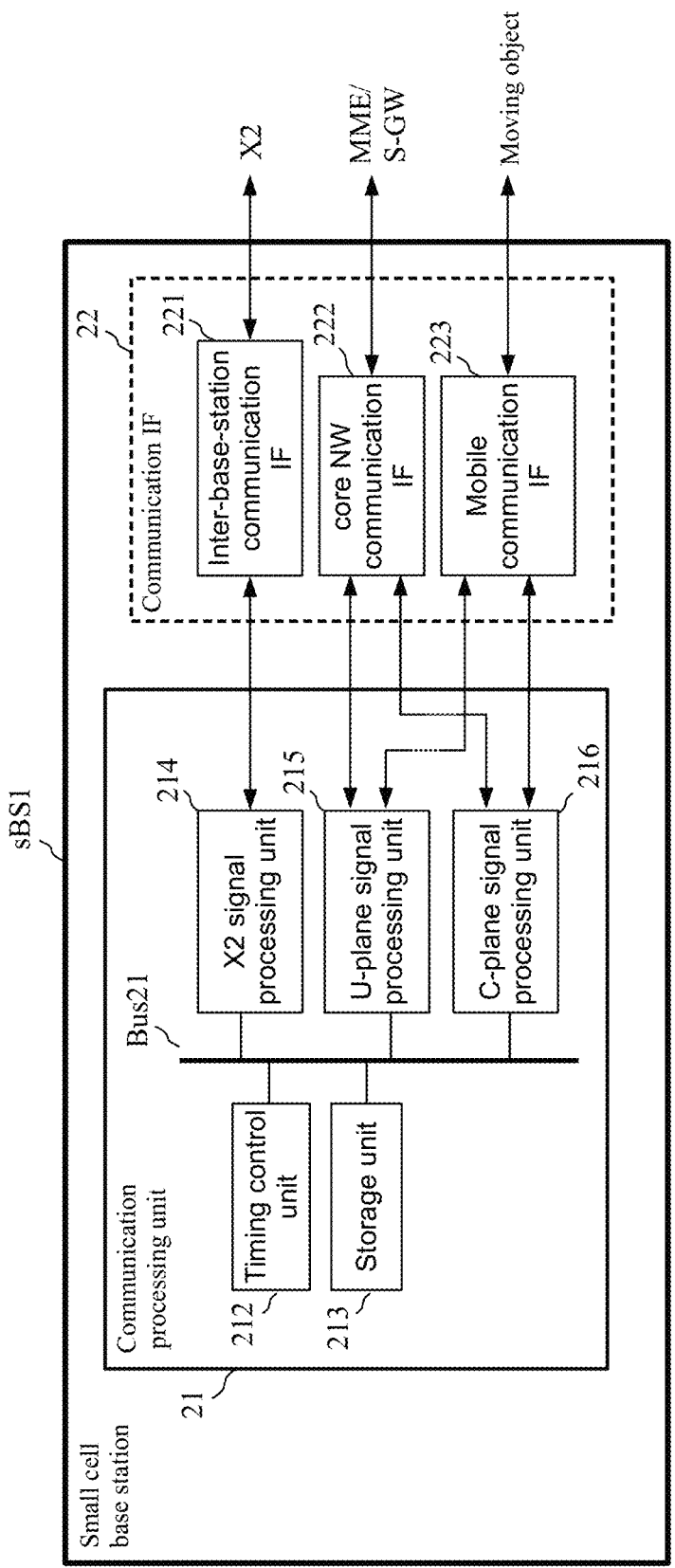
FIG. 6 is a schematic configuration diagram of a small cell base station sBS1 used in the positioning wireless communication system 1000 according to the first embodiment.

FIG. 6 is a schematic configuration diagram of a small cell base station sBS1 used in the positioning wireless communication system 1000 of the first embodiment.

Figure 7:
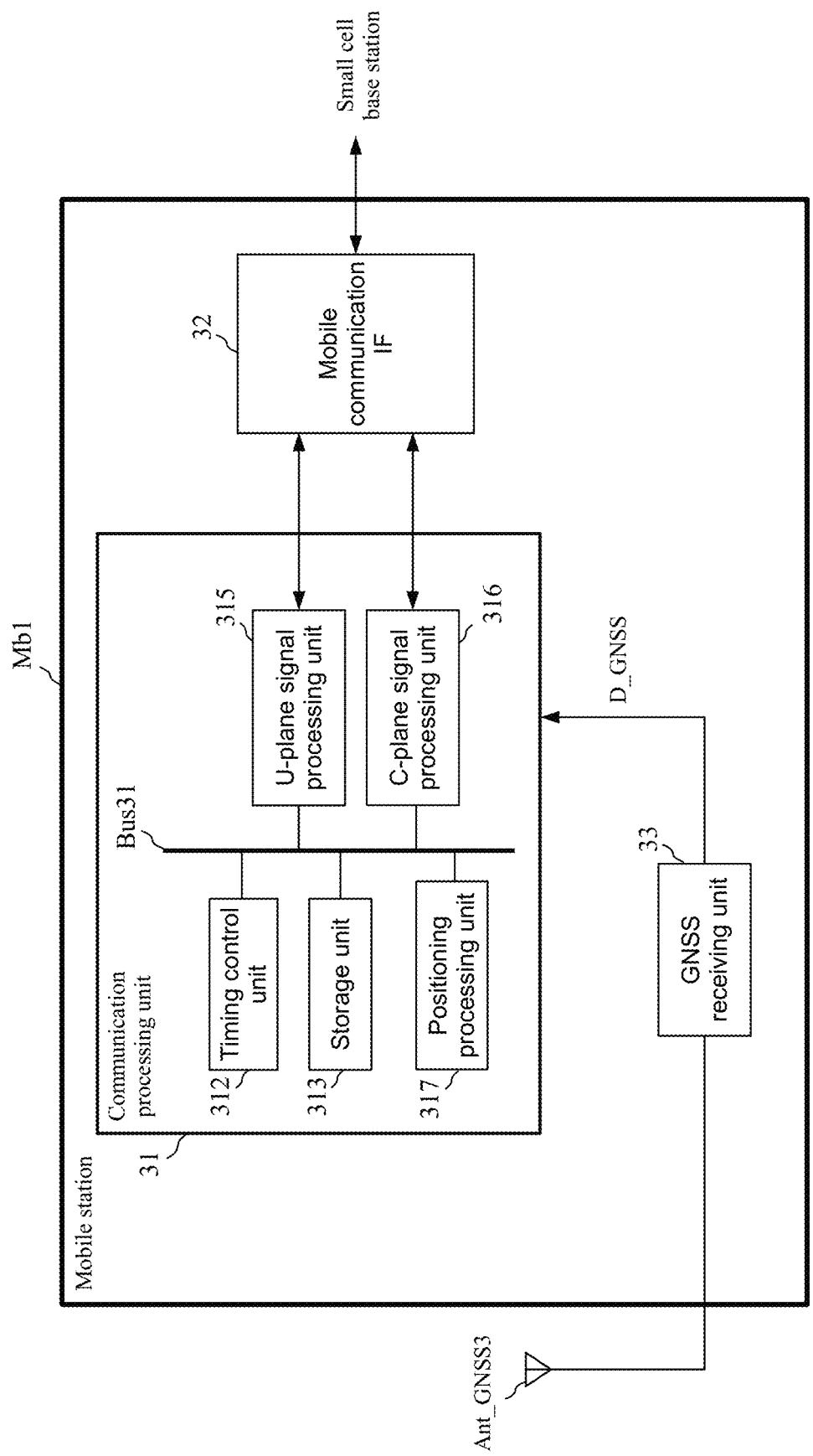
FIG. 7 is a schematic configuration diagram of a mobile station Mb1 used in the positioning wireless communication system 1000 according to the first embodiment.

FIG. 7 is a schematic configuration diagram of a mobile station Mb1 used in the positioning wireless communication system 1000 of the first embodiment.

Figure 8:
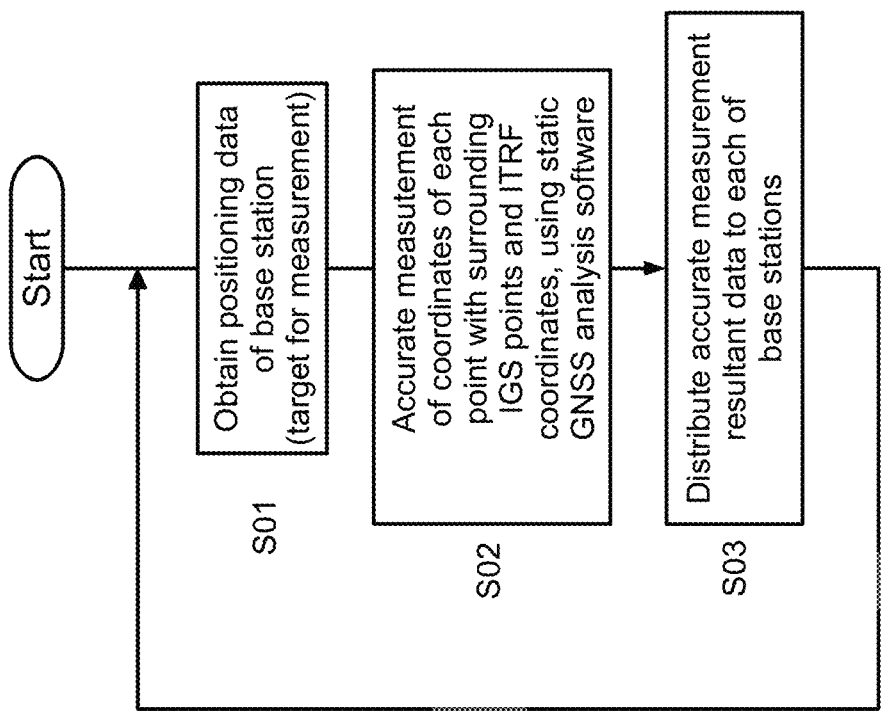
FIG. 8 is a flowchart of a method of collecting positioning data of each base station and distributing accurate measurement result data, which is performed in the positioning wireless communication system 1000 according to the first embodiment.

FIG. 8 is a flowchart of a method of collecting the positioning data of each base station and distributing the accurate measurement result data, which is performed in the positioning wireless communication system 1000 according to the first embodiment.

The positioning wireless communication system 1000 is a wireless communication system based on a heterogeneous network, and is a system that performs a positioning process that measures the position of the mobile station Mb1 with high accuracy using GNSS satellites. As shown in FIG. 1, the positioning wireless communication system 1000 includes macro cell base stations (in a case of FIG. 1, macro cell base stations mBS1 to mBS3), which each has a communicable range defined by a macro cell and each has high transmission power, a small cell base station (in a case of FIG. 1, a small cell base station sBS1), which has a communicable range defined by a small cell and has low transmission power, a core NW management stations NWC1 and NWC2 (MME/S-GW, MME: Mobility Management Entity, S-GW: Serving-Gateway) that manages and controls macro cell base stations and small cell base stations via a core network, a mobile phone network management system MC, and a calculation center SYS1 (base station position calculation system).

As shown in FIG. 1, the core NW management stations NWC1 and NWC2 and the mobile phone network management system MC1 are connected to, for example, a mobile phone network NW_tel. The mobile phone network management system MC1 and the calculation center SYS1 (base station position calculation system) are connected, for example, directly or via a network such as the Internet. In the positioning wireless communication system 1000, a plurality of small cells are set in one macro cell, and a small cell base station is installed for each small cell.

For convenience of description, the positioning wireless communication system 1000 will be described focusing on the macro cell base station mBS1 whose communicable area is a macro cell macro_C1, the macro cell base station mBS2 whose communicable area is a macro cell macro_C2, the macro cell base station mBS3 whose communicable area is a macro cell macro_C3, and the small cell base station sBS1 whose communicable area is a small cell small_C1 and the mobile station Mb1, as shown in FIG. 1.

Further, in the positioning wireless communication system 1000, a positioning process of measuring the position of a mobile station by receiving radio waves from a plurality of GNSS satellites (for example, N (N: natural number) GNSS satellites shown in FIG. 1) is performed. In the positioning wireless communication system 1000, each macro cell base station has a function of receiving radio waves from the GNSS satellites. Each macro cell base station is arranged such that the distance from an adjacent macro cell base station is, for example, 10 km or less.

(1.1.1: Configuration of Macro Cell Base Station mBS1)

As shown in FIG. 4, the macro cell base station mBS1 includes a communication processing unit 11, a communication interface 12, a GNSS antenna Ant_GNSS, and a GNSS receiving unit 13.

As shown in FIG. 4, the communication processing unit 11 includes a HO determination unit 111, a timing control unit 112, a storage unit 113, an X2 signal processing unit 114, a U-plane signal processing unit 115, and a C-plane signal processing unit 116 and a bus Bus11. The above-described functional units of the communication processing unit 11 are bus-connected with the bus Bus11, as shown in FIG. 4. Note that the above-described functional units of the communication processing unit 11 may be connected by another connection form (for example, direct connection) instead of bus connection. Further, the communication processing unit 11 receives data D_GNSS on the GNSS transmitted from the GNSS receiving unit 13.

The HO determining unit 111 determines whether the mobile station Mb1 needs to perform a C-plane handover from its own station (macro cell base station mBS1) to another macro cell base station.

The timing control unit 112, based on a signal on time information transmitted from the GNSS receiving unit 13, generates a clock signal used for inter-base-station communication, core network communication, and/or communication with the mobile body Mb1, and generates signals used as a standard for synchronization processing or the like; with the signals, the timing control unit 112 performs the above-described synchronization processing and controls communication timing for predetermined data and signals.

The storage unit 113 stores data that is necessary for processing in the communication processing unit 11 and that needs to be stored and held. The data stored in the storage unit 113 can be read by a functional unit that requires the data.

The X2 signal processing unit 114 performs processing for transmitting/receiving C-plane data and U-plane data to/from another base station (macro cell base station or small cell base station) via the inter-base-station communication interface 121.

The U-plane signal processing unit 115 performs processing for transmitting/receiving U-plane data to/from the core network (including the MME/S-GW) via the core NW communication interface 122. Also, the U-plane signal processing unit 115 performs processing for transmitting/receiving U-plane data to/from moving objects. Note that "U-plane" is a user plane, and represents data transmitted and received by a user, a procedure, or a mechanism in a wireless communication system.

The C-plane signal processing unit 116 performs processing for transmitting/receiving C-plane data to/from the core network (including the MME/S-GW) via the core NW communication interface 122. Also, the C-plane signal processing unit 116 performs processing for transmitting/receiving C-plane data to/from moving objects. Note that "C-plane" is a control plane, and/or represents data, signals, a procedure, or a mechanism for controlling communication in a wireless communication system.

Further, the positioning data processing unit 17 receives, as U-plane data, the accurate measurement resultant position data obtained by the calculation center SYS1 and the correction value obtained by the calculation center SYS1 via the core network management station.

As shown in FIG. 4, the communication interface 12 includes an inter-base-station communication interface 121, a core network communication interface 122, and a mobile communication interface 123.

The inter-base-station communication interface 121 communicates with other base stations (macro cell base station or small cell base station) using the X2 interface.

The core network communication interface 122 communicates with devices in the core network including the MME/S-GW.

The mobile communication interface 123 communicates with moving objects. The mobile communication interface 123 performs baseband processing, RF modulation processing, or and the like on data to be transmitted to a moving object, generates a radio signal to be transmitted to the moving object, and transmits the generated radio signal to the moving object. Also, the mobile communication interface 123 receives a wireless signal from a moving object and performs RF demodulation processing, baseband processing, or the like to obtain data transmitted from the moving object.

The GNSS antenna Ant_GNSS is an antenna for receiving radio waves from GNSS (Global Navigation Satellite System) satellites.

As shown in FIG. 5, the GNSS receiving unit 13 includes a high frequency amplifier 131, a frequency converter 132, an intermediate frequency amplifier 133, an AD converter 134, a code correlation unit 135, a local oscillator 136, and positioning data acquisition unit 137.

The high frequency amplifier 131 receives the RF signal RF1 received by the GNSS antenna Ant_GNSS and amplifies the RF signal RF1. The high frequency amplifier 131 transmits the amplified signal to the frequency converter 132.

The frequency converter 132 multiplies the signal transmitted from the high frequency amplifier 131 by an AC signal transmitted from the local oscillator 136 to performs processing for down-converting it to a signal with intermediate frequencies optimal for digitization. The signal obtained by the above processing is then transmitted from the frequency converter 132 to the AD converter 134.

The AD converter 134 performs AD conversion on the signal transmitted from the frequency converter 132, obtains a digital signal, and transmits the obtained digital signal to the code correlation unit 135.

The code correlation unit 135 performs C/A code (Coarse/Acquisition code) demodulation processing on the signal transmitted from the AD converter 134. Specifically, the code correlation unit 135 performs code demodulation with comparison with the C/A code unique to each satellite. The code correlation unit 135 performs C/A code demodulation in parallel, for example, based on n PRN (Pseudo Random Noise code) codes PRN1 to PRNn (codes corresponding to n satellites and identifying satellites). The code demodulation result corresponding to each satellite is then transmitted to the positioning data acquisition unit 137. The code correlation unit 135 also transmits the demodulation result data to the local oscillator 136.

The local oscillator 136 receives the demodulation result data transmitted from the code correlation unit 135, generates an AC signal having a frequency based on the demodulation result data, and transmits the AC signal to the frequency converter 132.

As shown in FIG. 5, the positioning data acquisition unit 137 includes a time information acquisition unit 1371, a navigation message acquisition unit 1372, a pseudo range acquisition unit 1373, and a carrier phase acquisition unit 1374.

The time information acquisition unit 1371 acquires time information (for example, time information based on a satellite atomic clock) from the code demodulation result.

The navigation message acquisition unit 1372 acquires a navigation message from the code demodulation result.

The pseudo range acquisition unit 1373 acquires a pseudo range from the code demodulation result. Specifically, the pseudo range acquisition unit 1373 shifts, by one bit, the bits of the code in the GNSS receiving unit 13, and inputs the shifted code into the code correlation unit 135 to calculate a autocorrelation coefficient. The autocorrelation coefficient becomes zero when the timings of both codes are different, whereas it is close to 1 when both codes are synchronized; thus, the time corresponding to the number of bits shifted until synchronization is established corresponds to a code timing difference $\Delta T$ for both the codes, which can be interpreted as the propagation time of the signal (radio wave) transmitted from the corresponding satellite. The pseudo range is acquired by multiplying the propagation time by the velocity of the radio wave.

The carrier phase acquisition unit 1374 acquires a carrier phase from the code demodulation result. Specifically, the carrier phase acquisition unit 1374 multiplies a carrier (a radio wave from a satellite) in the GNSS receiving unit 13 by a reference carrier generated in the GNSS receiving unit 13 to observe a phase (beat phase) of a beat signal representing a phase difference between the two. Then, the integrated value $\Phi$ of the phase from a certain reference time t0 to the time t, that is, the carrier phase data (carrier integrated value) $\Phi$ is acquired.

The GNSS receiving unit 13 collectively transmits each piece of data acquired by the positioning data acquisition unit 137 to the communication processing unit 11 as positioning data D_GNSS.

Note that the configurations of the macro cell base stations mBS2 and mBS3 are the same as the configuration of the macro cell base station mBS1.

(1.1.2: Configuration of Small Cell Base Station sBS1)

As shown in FIG. 6, the small cell base station sBS1 includes a communication processing unit 21 and a communication interface 22.

As shown in FIG. 6, the communication processing unit 11 includes a timing control unit 212, a storage unit 213, an X2 signal processing unit 214, a U-plane signal processing unit 215, a C-plane signal processing unit 216, and a bus Bus 21. The above-described functional units of the communication processing unit 21 are bus-connected with the bus Bus21 as shown in FIG. 6. Note that the above-described functional units of the communication processing unit 21 may be connected by another connection form (for example, direct connection) instead of bus connection.

The timing control unit 212 generates a clock signal used for inter-base-station communication, core network communication, and/or communication with the moving object Mb1, a signal that is a reference for synchronization processing, or the like; with the signals, the timing control unit 212 performs the above-described synchronization processing and controls communication timing for predetermined data and signals.

The storage unit 213 stores data that is necessary for processing in the communication processing unit 21 and that needs to be stored and held. The data stored in the storage unit 213 can be read by the functional unit that requires the data.

The X2 signal processing unit 214 performs processing for transmitting/receiving C-plane data and U-plane data to/from another base station (macro cell base station or small cell base station) via the inter-base-station communication interface 221.

The U-plane signal processing unit 215 performs processing for transmitting/receiving U-plane data to/from the core network (including the MME/S-GW) via the core NW communication interface 222. Also, the U-plane signal processing unit 215 performs processing for transmitting/receiving U-plane data to/from moving objects.

The C-plane signal processing unit 216 performs processing for transmitting/receiving C-plane data to/from the core network (including the MME/S-GW) via the core NW communication interface 122. Also, the C-plane signal processing unit 216 performs processing for transmitting/receiving C-plane data to/from moving objects.

As shown in FIG. 6, the communication interface 22 includes an inter-base-station communication interface 221, a core network communication interface 222, and a mobile communication interface 223.

The inter-base-station communication interface 221 communicates with other base stations (macro cell base station or small cell base station) using the X2 interface.

The core network communication interface 222 communicates with devices in the core network including the MME/S-GW.

The mobile communication interface 223 communicates with moving objects. The mobile communication interface 223 performs baseband processing, RF modulation processing, or and the like on data to be transmitted to a moving object, generates a radio signal to be transmitted to the moving object, and transmits the generated radio signal to the moving object. Also, the mobile communication interface 223 receives a wireless signal from a moving object and performs RF demodulation processing, baseband processing, or the like to obtain data transmitted from the moving object.

(1.1.3: Configuration of Mobile Station Mb1)

As shown in FIG. 7, the mobile station Mb1 includes a communication processing unit 31, a mobile communication interface 32, a GNSS antenna Ant_GNSS3, and a GNSS receiving unit 33.

As shown in FIG. 7, the communication processing unit 31 includes a timing control unit 312, a storage unit 313, a U-plane signal processing unit 315, a C-plane signal processing unit 316, and a bus Bus31. The above-described functional units of the communication processing unit 31 are bus-connected by the bus Bus31 as shown in FIG. 7. Note that the above-described functional units of the communication processing unit 31 may be connected by another connection form (for example, direct connection) instead of bus connection. Also, the communication processing unit 31 receives data D_GNSS on the GNSS and data D_clock on time information transmitted from the GNSS receiving unit 13.

Based on a signal on time information transmitted from the GNSS receiving unit 13, the timing control unit 312 generates a clock signal used for communication with the small cell base station and/or the macro cell base station, a signal serving as a reference for synchronization processing, or the like; with the signals, the timing control unit 312 performs the above-described synchronization processing and controls communication timing for predetermined data and signals.

The storage unit 313 stores data that is necessary for processing in the communication processing unit 31 and that needs to be stored and held. Then, the data stored in the storage unit 313 can be read by a functional unit that requires the data.

The U-plane signal processing unit 315 performs processing for transmitting/receiving U-plane data to/from the small cell base station and/or the macro cell base station via the mobile communication interface 32. Also, the U-plane signal processing unit 315 performs processing for transmitting/receiving U-plane data to/from the small cell base station and/or the macro cell base station.

The C-plane signal processing unit 316 performs processing for transmitting/receiving C-plane data to/from the small cell base station and/or the macro cell base station via the mobile communication interface 32. Also, the C-plane signal processing unit 316 performs processing for transmitting/receiving C-plane data to/from the small cell base station and/or the macro cell base station.

The mobile communication interface 32 communicates with the small cell base station and/or the macro cell base station. The mobile communication interface 32 performs baseband processing, RF modulation processing, or the like on data to be transmitted to the small cell base station and/or the macro cell base station, generates a radio signal to be transmitted to a moving object, and transmits the generated radio signal to the small cell base station and/or the macro cell base station. In addition, the mobile communication interface 32 receives a radio signal from the small cell base station and/or the macro cell base station, and performs RF demodulation processing, baseband processing, or the like to obtain data transmitted from the small cell station and/or the macro cell base station.

The GNSS antenna Ant_GNSS3 is an antenna for receiving radio waves from a GNSS (Global Navigation Satellite System) satellites.

The GNSS receiving unit 33 has the same configuration as the GNSS receiving unit 13 of the macro cell base station mBS1. The GNSS receiving unit 33 transmits the acquired positioning data D_GNSS to the communication processing unit 31.

<1.2: Operation of Positioning Wireless Communication System>

The operation of the positioning wireless communication system 1000 configured as above will be described below.

FIG. 8 is a flowchart of a method of collecting positioning data of each base station and distributing accurate measurement result data, which is performed in the positioning wireless communication system 1000 according to the first embodiment.

(1.2.1: Processing for Collecting Positioning Data of Each Base Station and distributing accurate measurement result data)

First, processing of collecting positioning data of each base station and processing of delivering accurate measurement result data will be described with reference to the flowchart of FIG. 8.

(Step S01):

In step S01, each macro cell base station causes the communication processing unit 11 to transmit positioning data D_GNSS acquired by the GNSS receiving unit 13 to the core network management station via the communication interface 12.

The core network management station collects positioning data D_GNSS from the managed macro cell base station, and transmits the collected positioning data D_GNSS to the calculation center SYS1 via the mobile phone network management system MC1.

(Step S02):

In step S02, the calculation center SYS1 accurately measures coordinate values of each point (each macro cell base station), using the static GNSS analysis software, with the IGS points around each macro cell base station (position reference station) and ITRF coordinates.

(Step S03):

In step S03, the calculation center SYS1 transmits the accurate measurement result data of each macro cell base station (position reference station) acquired by the above processing to the mobile phone network management system MC1.

The mobile phone network management system MC1 identifies the core network management station that manages the corresponding macro cell base station, and then transmits the accurate measurement result data about the base station to the corresponding macro cell base station via the identified core network management station.

Each macro cell base station receives the accurate measurement result data of itself from the core network management station through the communication interface 12. The positioning data processing unit 17 of the communication processing unit 11 then obtains data indicating the accurate position of each micro cell base station from the received data and stores the acquired data in the storage unit 113.

The above processing is repeatedly performed at a predetermined cycle. This allows each macro cell base station serving as the position reference station to always hold the data indicating the accurate position of each micro base station.

Note that while performing the above-mentioned processing, the calculation center SYS1 may perform processing for generating data necessary for RTK positioning or the like, based on the positioning data collected from each macro cell base station (this is referred to as positioning data D1_GNSS). For example, the calculation center SYS1 may obtain data (accurate position data of the macro cell base station, pseudo range data observed by the macro cell base station, and/or carrier phase data observed by the macro cell base station) required when measuring the position of a mobile station by RTK positioning in association with the target macro cell base station. The calculation center SYS1 may manage such data using a table as shown in FIG. 1, for example.

The calculation center SYS1 may transmit the above-mentioned data (for example, data necessary for RTK positioning) to each macro cell base station as RTCM (Radio Technical Commission for Maritime Services) data, for example. At this time, the calculation center SYS1 preferably transmits the above data to each macro cell base station as an RTCM-compliant frame.

(1.2.2: Positioning Process of Mobile Station)

Next, a positioning process of a mobile station will be described.

In the positioning wireless communication system 1000, the macro cell base stations are arranged so that the distance to an adjacent macro cell base station is several km or less (for example, 10 km or less), and each macro cell base station includes a GNSS receiving unit 13. The mobile station Mb1 also includes a GNSS receiving unit 33. Thus, in the positioning wireless communication system 1000, setting each macro cell base station as a reference point (point for which accurate coordinates are obtained) allows the position of the mobile station Mb1, which is a point (unknown point) to be actually measured, to be measured by relative positioning (for example, DGPS (differential global positioning system) or RTK (Realtime Kinetic)).

Performing the above processing in the positioning wireless communication system 1000 allows the coordinate values of each macro cell base station by the global geodetic coordinate system (GGRF) to be obtained; data on the obtained coordinate values is then stored in the storage unit 113.

In the following, a case in which in the positioning wireless communication system 1000, each macro cell base station is used as a reference point (position reference station), the mobile station Mb1 is used as an unknown point, and the position of the mobile station Mb1 is to be measured (positioned) by RTK, and furthermore the station Mb1 moves from the macro cell macro_C1 to the macro cell macro_C2 will be described.

Figure 9:
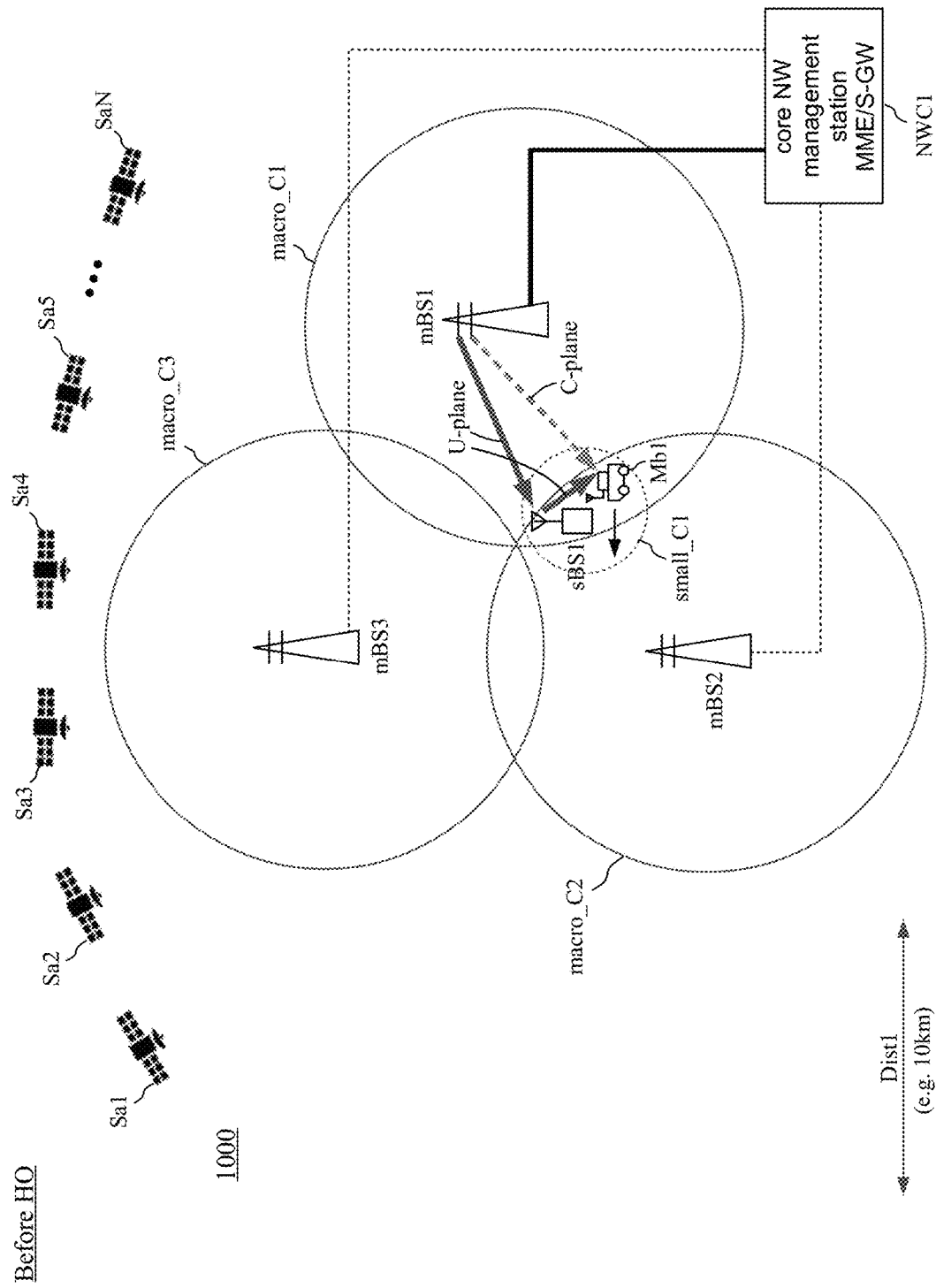
FIG. 9 is a diagram showing a state before handover processing for C-plane is performed in the positioning wireless communication system 1000 when the mobile station Mb1 moves from a macro cell macro_C1 to a macro cell macro_C2.

FIG. 9 is a diagram showing a state before a C-plane handover process is performed in the positioning wireless communication system 1000 when the mobile station Mb1 moves from the macro cell macro_C1 to the macro cell macro_C2.

Figure 10:
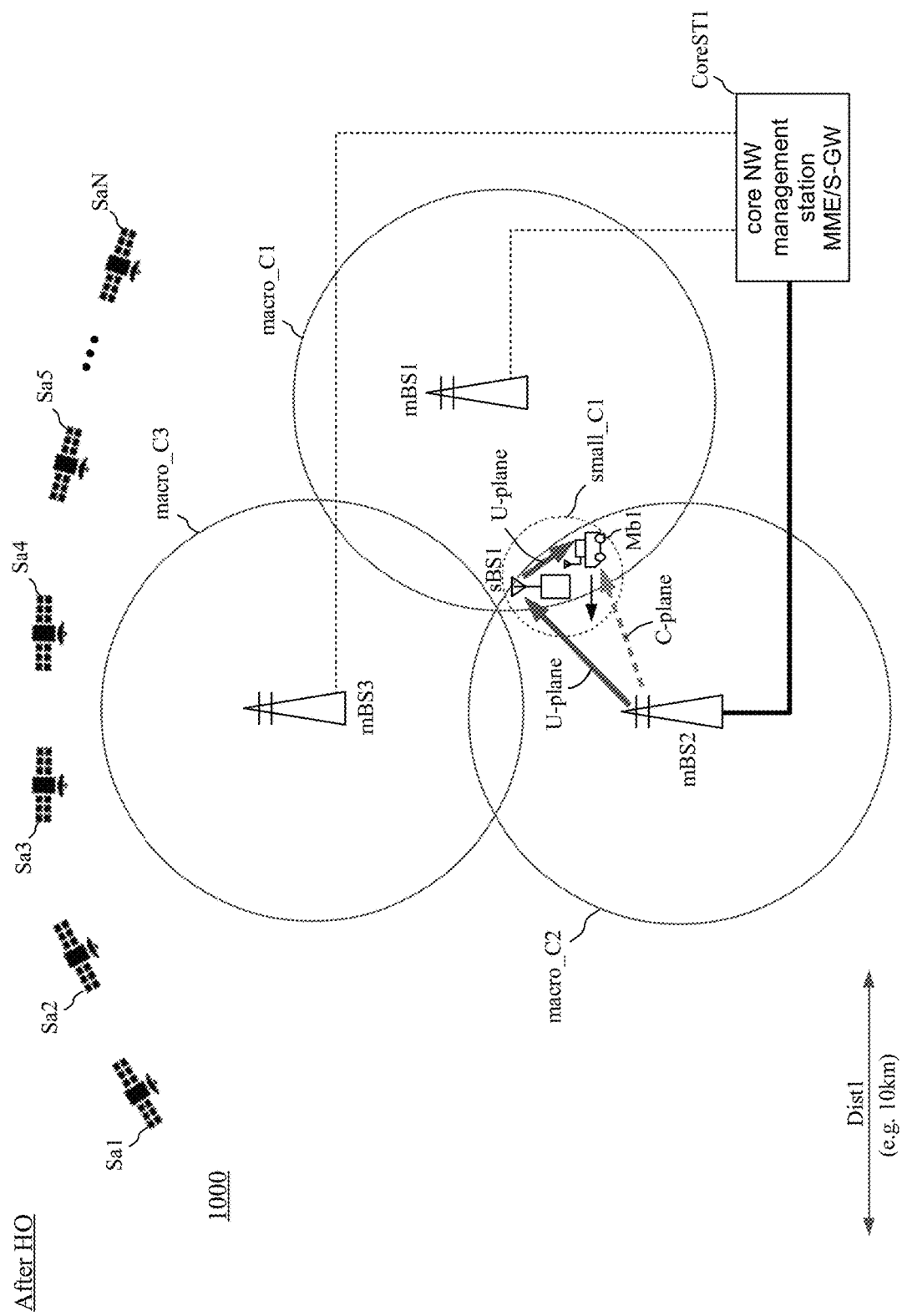
FIG. 10 is a diagram showing a state after handover processing for C-plane is performed in the positioning wireless communication system 1000 when the mobile station Mb1 moves from the macro cell macro_C1 to the macro cell macro_C2.

FIG. 10 is a diagram showing a state after the C-plane handover process is performed in the positioning wireless communication system 1000 when the mobile station Mb1 moves from the macro cell macro_C1 to the macro cell macro_C2.

Figure 11:
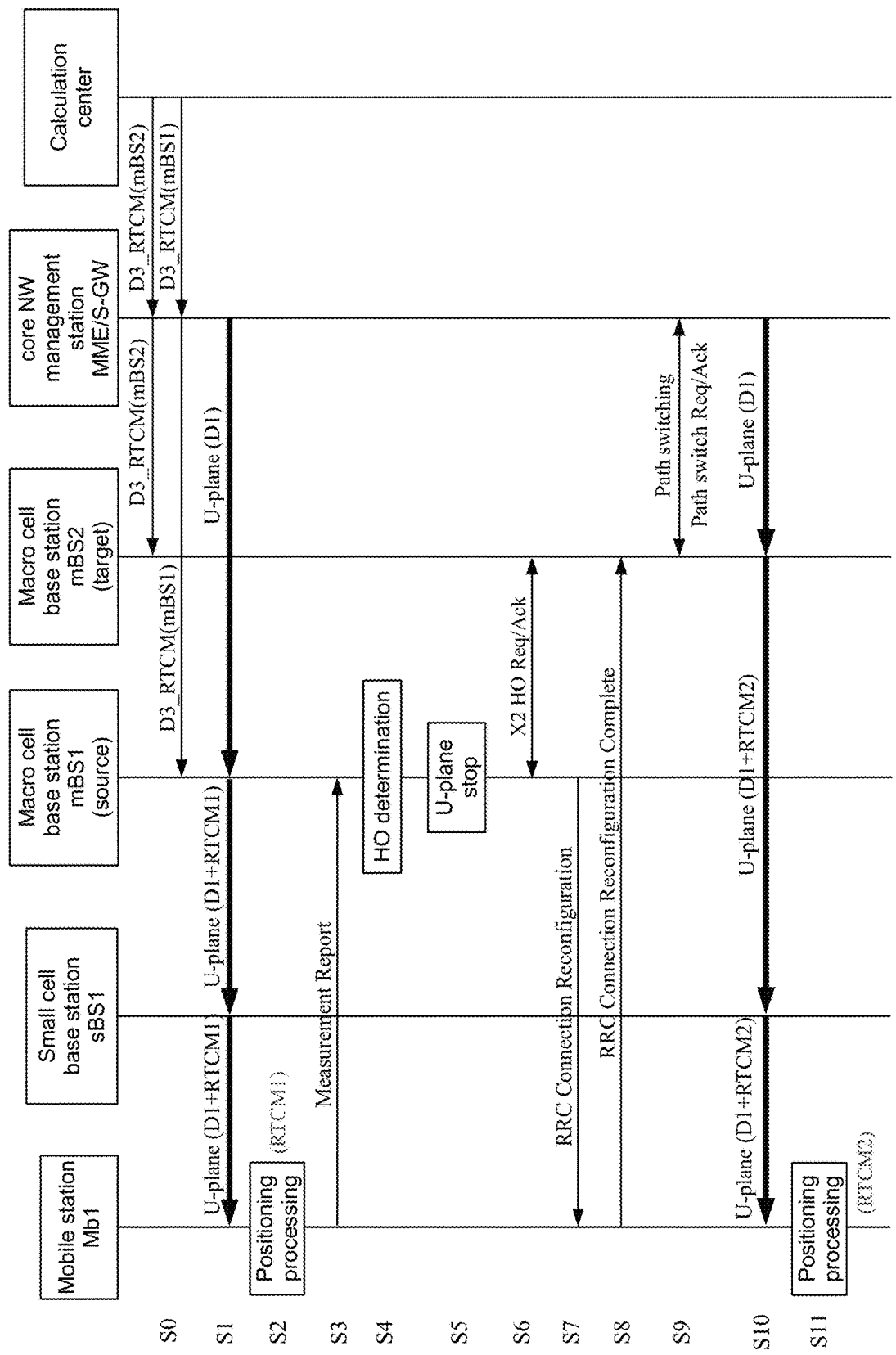
FIG. 11 is a sequence diagram of processing performed in the positioning wireless communication system 1000.

FIG. 11 is a sequence diagram of processing performed by the positioning wireless communication system 1000.

The operation of the positioning wireless communication system 1000 will be described below with reference to the sequence diagram of FIG. 11.

(Step S0):

In step S0, the calculation center SYS1 transmits, as data D3_RTCM (mBS1), data (the position of the station, the carrier phase data acquired by itself, or the like) which is necessary for RTK positioning between the macro cell base station mBS1 and the mobile station, to the core network management station NWC1 via the mobile phone network management system MC1 and the mobile phone network NW_tel. Note that the data D3_RTCM (mBS1) is data generated in the calculation center SYS1 and is data obtained by converting data necessary in performing RTK positioning by the macro cell base station mBS1 into RTCM-format data. The core network management station NWC1 transmits the received data D3_RTCM (mBS1) to the macro cell base station mBS1. The macro cell base station mBS1 receives the data D3_RTCM (mBS1) transmitted from the core network management station NWC1.

The macro cell base station mBS1 stores and holds the received data D3_RTCM (mBS1).

The calculation center SYS1 transmits data (the position of the station, the carrier phase data acquired by itself, or the like), as data D3_RTCM (mBS2), which is necessary for RTK positioning between the macro cell base station mBS2 and the mobile station, to the core network management station NWC1 via the mobile phone network management system MC1 and the mobile phone network NW_tel. Note that the data D3_RTCM (mBS2) is data generated in the calculation center SYS1 and is data obtained by converting data necessary in performing RTK positioning by the macro cell base station mBS2 into RTCM-format data. The core network management station NWC1 transmits the received data D3_RTCM (mBS2) to the macro cell base station mBS2. The macro cell base station mBS2 receives the data D3_RTCM (mBS2) transmitted from the core network management station NWC1.

The macro cell base station mBS2 stores and holds the received data D3_RTCM (mBS2).

(Step S1):

In step S, the core network management station transmits user data D1 addressed to the mobile station Mb1 to the macro cell base station mBS1 as U-plane data U-plane (D1).

The macro cell base station mBS1 receives U-plane data U-plane (D1) from the core network management station.

Further, the macro cell base station mBS1 obtains data for use in RTK with the mobile station Mb1 from the data D3_RTCM (mBS1) received from the calculation center SYS1 and the accurate measurement result data for the micro cell base station mBS1 (data including the accurate measurement position data for the micro cell base station mBS1) received from the calculation center SYS. In other words, the macro cell base station mBS1 obtains, as RTCM data (RTCM: Radio Technical Commission for Maritime Services), data including:

(1) carrier phase observation data
(2) pseudo range observation data, and
(3) base station coordinate values (coordinate values of the accurate position of macro cell base station mBS1).

The macro cell base station mBS1 transmits, as U-plane data (this data is referred to as data U-plane (D1+RTCM1)), the RTCM data (which will be referred to as data RTCM1) obtained as described above and the data D1 received from the core network management station to the small cell base station sBS1 that includes the mobile station Mb1 in the area (small cell) of the small cell base station sBS1.

The small cell base station sBS1 receives the U-plane data U-plane (D1+RTCM1) from the macro cell base station mBS1 and transmits the received data to the mobile station Mb1 as U-plane data U-plane (D1+RTCM1).

The mobile station Mb1 receives the U-plane data U-plane (D1+RTCM1) from the macro cell base station mBS1, obtains the user data D1 addressed to the mobile station Mb1, and also obtains data RTCM1 which is RTCM data of the base station mBS1 that is a position reference station necessary for performing RTK positioning.

(Step S2):

In step S2, the mobile station Mb1 obtains data necessary for RTK positioning from the data RTCM1 that is RTCM data obtained as described above by the positioning processing unit 317, and measures (specifies) the position of the mobile station Mb1 by RTK positioning.

Note that in the RTK positioning calculation, calculating a double phase difference of the carrier (radio waves from the GNSS satellites) eliminates satellite clock errors and furthermore if a baseline length, which is a distance between a position reference station (corresponding to the macro cell base station mBS1) and an unknown point (corresponding to the mobile station Mb), is sufficiently short, most of propagation delay errors and satellite orbit errors of the ionosphere and troposphere, in which the same value is included as an error in each pseudo range, are eliminated. For example, when a distance between the position reference station and the position (unknown point) of the mobile station is 10 km or less and the number of GNSS satellites whose GNSS signal can be received is 13 or more, the position of the unknown point can be calculated instantaneously.

In the positioning wireless communication system 1000, the position of the macro cell base station, which is a position reference station, is accurately obtained by the calculation center SYS1. Further, in the positioning wireless communication system 1000, the macro cell base station, which is a position reference station, is arranged so that the distance from the adjacent macro cell base station is 10 km or less; thus, the above-mentioned baseline length is 10 km or less. In this case (i.e., a case in which the distance between the position reference station and the position (unknown point) of the mobile station is 10 km or less), when the number of GNSS satellites whose GNSS signal can be received is 13 or more, the position of the unknown point can be instantaneously calculated. In this case, the measurement error of the position of the mobile station (mobile station Mb1) is within a range from 2 cm-2 ppm to 2 cm+2 ppm (positioning error 4 cm or less), thus enabling high-accuracy positioning.

(Steps S3 to S8):

In step S3, the mobile station Mb1 transmits reception quality information (Measurement Report) to the macro cell base station mBS1.

In step S4, the macro cell base station mBS1 determines whether the mobile station Mb1 needs to be handed over to another macro cell base station based on the reception quality information (Measurement Report) received from the mobile station Mb1. When it is determined that the macro cell base station mBS2 needs to be handed over, the macro cell base station mBS1 stops the control of user-plane communication processing (step S5).

In step S6, the X2 interface is used to transmit a handover request (request) to the macro cell base station mBS2, and the macro cell base station mBS2 returns Ack to the request.

Using RRC (Radio Resource Control) signaling, the macro cell base station mBS1 transmits, to the mobile station Mb1, a message (RRC Connection Reconfiguration) instructing to re-establish a connection for C-plane communication with the macro cell base station mBS2 to which communication connection is to be switched by handover processing (step S7).

The mobile station Mb1 resets the connection with the macro cell base station mBS2 based on the received RRC Connection Reconfiguration. When the reconfiguration has been completed, a message (RRC Connection Reconfiguration Complete) indicating the completion of the reconfiguration is transmitted to the macro cell base station mBS2 of the handover destination (the macro cell base station mBS2 to which communication connection is to be switched by handover processing) (step S8).

(Step S9):

In step S9, path switching processing is performed between the macro cell base station mBS2 that is the handover destination and the core network management station.

(Step S10):

In step S10, the core network management station transmits the user data D1 addressed to the mobile station Mb1 as U-plane data U-plane (D1) to the handover destination macro cell base station mBS2.

The macro cell base station mBS2 receives U-plane data U-plane (D1) from the core network management station.

Further, the macro cell base station mBS2 obtains data for use in RTK with the mobile station Mb1 from the data D3_RTCM (mBS2) received from the calculation center SYS1 and the accurate measurement result data for the micro cell base station mBS2 (data including the accurate measurement position data for the micro cell base station mBS2) received from the calculation center SYS; that is, the macro cell base station mBS2 obtains, as RTCM data, data including:

(1) carrier phase observation data
(2) pseudo range observation data, and
(3) base station coordinate values (coordinate values of accurate position of macro cell base station mBS2).

The macro cell base station mBS2 transmits, as U-plane data (this data is referred to as data U-plane (D1+RTCM2)), the RTCM data (which will be referred to as data RTCM2) obtained as described above and the data D1 received from the core network management station to the small cell base station sBS1 that includes the mobile station Mb1 in the area (small cell) of the small cell base station sBS2.

The small cell base station sBS1 receives the U-plane data U-plane (D1+RTCM2) from the macro cell base station mBS2, and transmits the received data to the mobile station Mb1 as U-plane data U-plane (D1+RTCM2).

The mobile station Mb1 receives the U-plane data U-plane (D1+RTCM2) from the macro cell base station mBS2, obtains the user data D1 addressed to the mobile station Mb1, and also obtains data RTCM2 which is RTCM data of the base station mBS2 that is a position reference station necessary for performing RTK positioning.

(Step S11):

In step S11, the mobile station Mb1 obtains data necessary for RTK positioning from the data RTCM2 that is RTCM data obtained as described above by the positioning processing unit 317, and measures (specifies) the position of the mobile station Mb1 by RTK positioning.

As described above, in the positioning wireless communication system 1000, even when the mobile station Mb1 moves from the macro cell macro_C1 to the macro cell macro_C2 at high speed, in performing handover processing, the position reference station from which data necessary for RTK positioning is obtained is changed from the micro cell base station mBS1 with which communication connection has been established before handover processing to the micro cell base station mBS2 to which communication connection is to be switched by handover processing. Thus, in the positioning wireless communication system 1000, even when the mobile station Mb1 moves at a high speed from the macro cell macro_C1 to the macro cell macro_C2, data necessary for RTK positioning is always obtained as U-plane data from the position reference station (macro cell base station) capable of performing highly accurate RTK positioning.

Further, in the positioning wireless communication system 1000, the calculation center SYS1 obtains the accurate position of the macro cell base station serving as the position reference station and distributes the accurate position to each macro cell base station. Thus, each macro cell base station can always hold the position of the own station (each macro cell base station) as highly accurate position data.

In the positioning wireless communication system 1000, the macro cell base station, which is the position reference station capable of always specifying its position with high accuracy, is arranged so that the distance from the adjacent macro cell base station is 10 km or less, thus ensuring that the RTK positioning base line length is 10 km or less. This allows the position of an unknown point to be instantly calculated when the number of GNSS satellites from which the GNSS signal can be received is 13 or more. Accordingly, even when the mobile station Mb1 is moving at high speed, performing high-accurate RTK positioning allows the position of the mobile station Mb1 to be specified with high accuracy and at high speed.

Although the case where the handover determination processing is performed by the macro cell base station has been described above, the present invention should not be limited to this. For example, the handover processing may be performed by the core network management station.

In the above, the mobile station Mb1 can measure an accurate position; however, when the accurate position is displayed on a map (static map) created based on a static digital map, for example, there is an error between the correct position and the position displayed on the static map, thereby causing the position of the mobile station Mb1 to be displayed at a position displaced from the correct position on the static map. To prevent this, the calculation center SYS1 may transmit the error information between the static digital map and the precision digital map generated by the calculation center SYS1 (the digital map created using the precision measurement result) to the mobile station Mb1. The mobile station Mb1 can display the mobile station Mb1 at an appropriate position on the static map by changing the position using this error information. When the static digital map has been updated, the mobile station Mb1 may receive information indicating that the static digital map has been updated and information on correction values for correcting the static digital map before updating to the static digital map after updating, from the calculation center SYS1, via the mobile phone network management system MC, the core network management station, the macro cell base station, and the small cell base station. This allows the mobile station Mb1 to perform a process of displaying the mobile station Mb1 at an appropriate position on the updated static map based on the correction values even when the static digital map has been updated.

«Modification»

Next, a modified example of the first embodiment will be described.

The same parts as those in the above embodiment are designated by the same reference numerals, and detailed description thereof will be omitted.

A positioning wireless communication system of the present modification differs from the first embodiment in that the mobile station Mb1 performs positioning determination processing. In the positioning wireless communication system of the present modification, when the reception condition of radio waves from the GNSS satellites at a macro cell base station to which communication connection is to be switched by handover processing is poor, a destination station (a macro cell base station serving as a position reference station) from which positioning data (RTCM data) is obtained can be changed.

Figure 12:
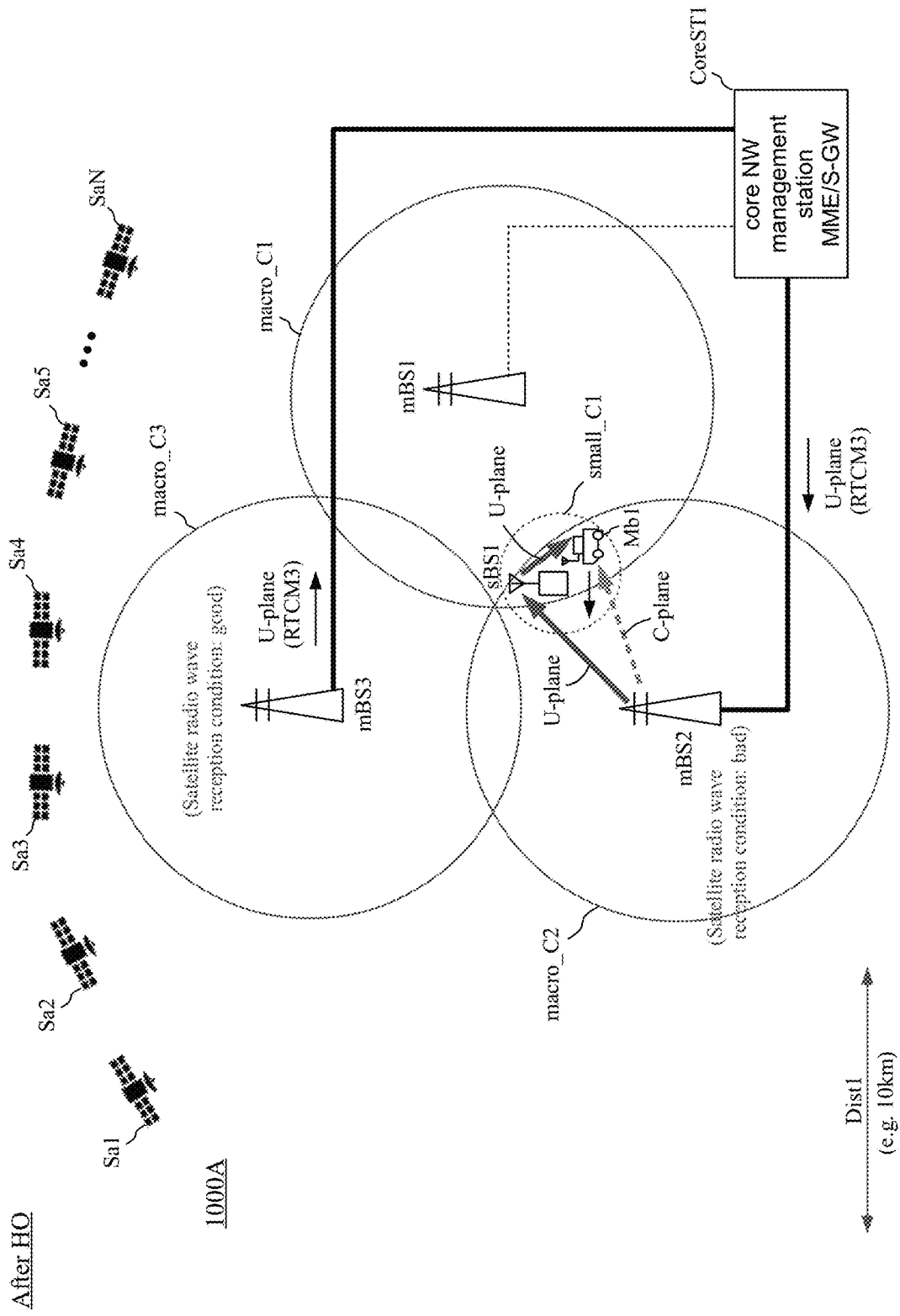
FIG. 12 is a diagram showing a state after handover processing for C-plane is performed in the positioning wireless communication system 1000A of this modification when the mobile station Mb1 moves from the macro cell macro_C1 to the macro cell macro_C2.

FIG. 12 is a diagram showing a state after C-plane handover processing is performed in the positioning wireless communication system 1000A of this modification when the mobile station Mb1 moves from the macro cell macro_C1 to the macro cell macro_C2. Note that FIG. 12 shows a state in which the reception condition of radio waves from the GNSS satellite at the macro cell base station mBS2 is poor and the reception condition of radio waves from the GNSS satellite at the macro cell base station mBS3 is good.

Figure 13:
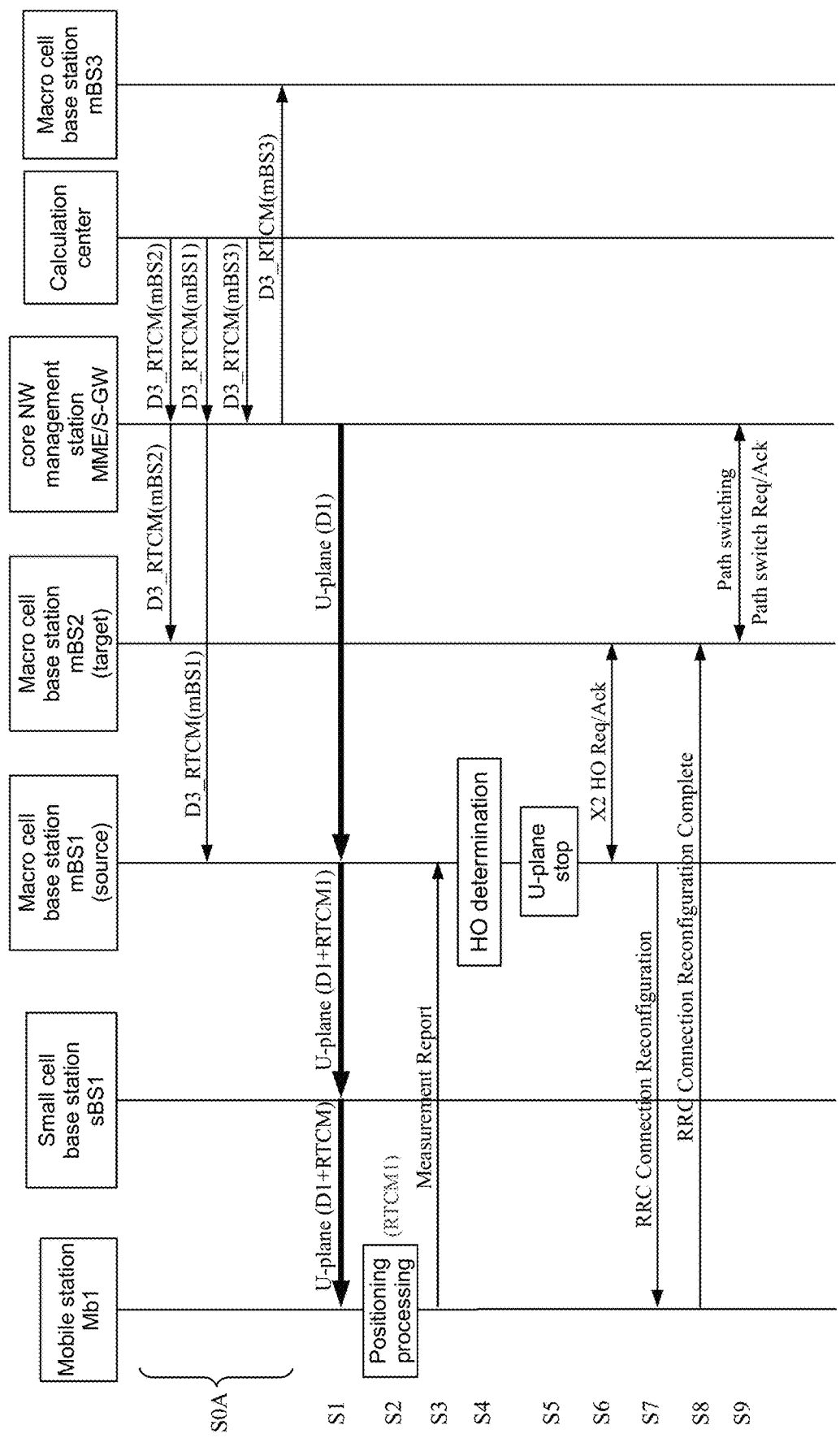
FIG. 13 is a sequence diagram of processing performed in a positioning wireless communication system 1000A according to a modified example of the first embodiment.
Figure 14:
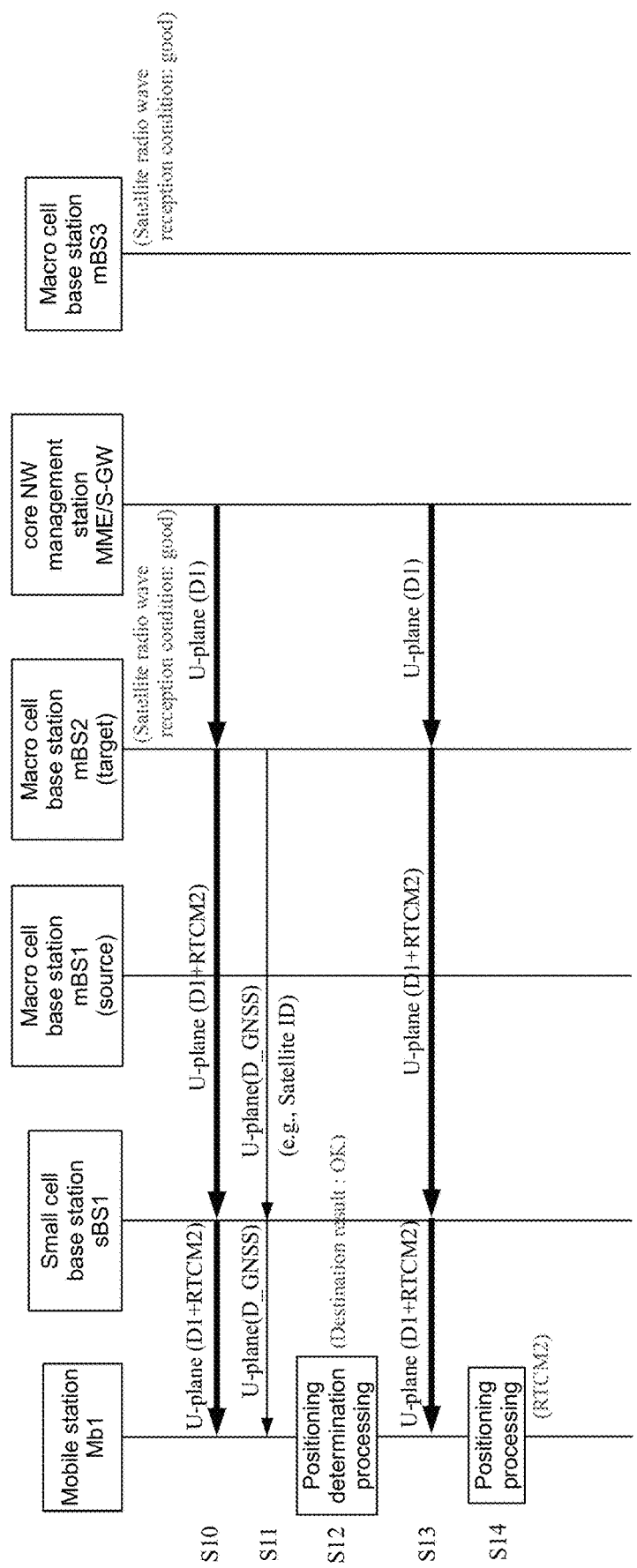
FIG. 14 is a sequence diagram of processing performed in the positioning wireless communication system 1000A according to the modified example of the first embodiment.
Figure 15:
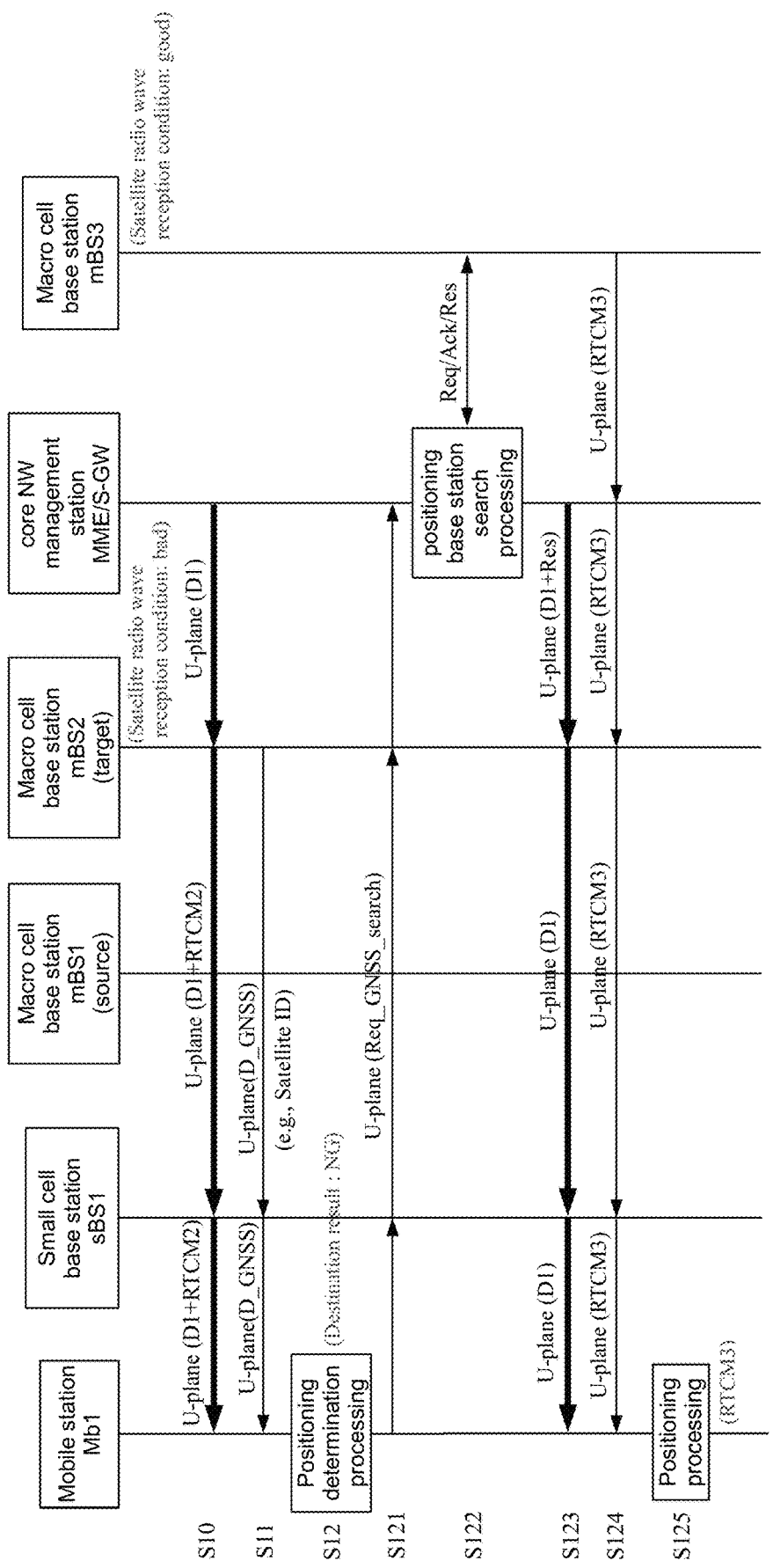
FIG. 15 is a sequence diagram of processing performed in the positioning wireless communication system 1000A according to the modified example of the first embodiment.
Figure 16:
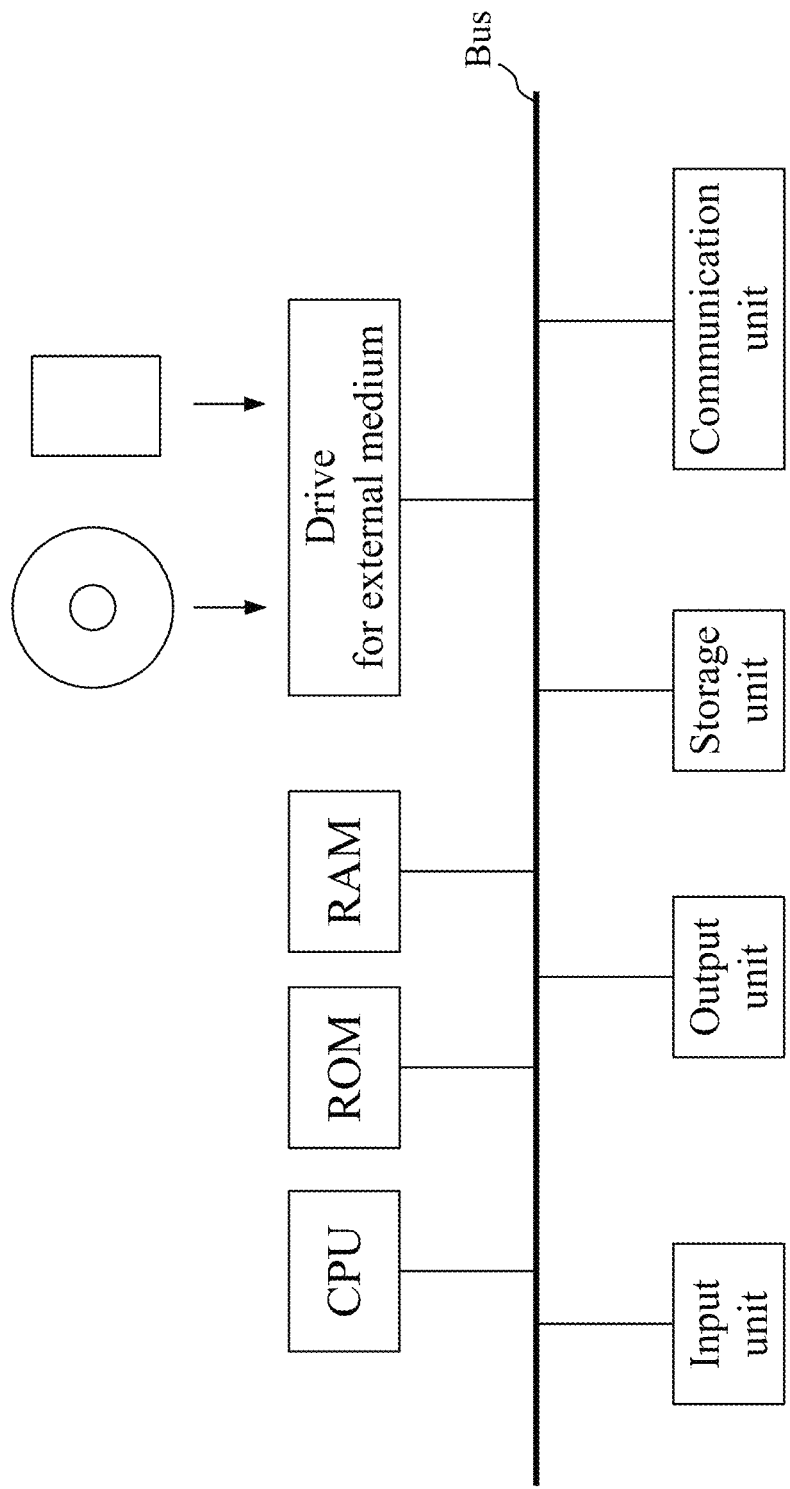
FIG. 16 is a diagram showing a CPU bus configuration.

FIGS. 13 to 15 are sequence diagrams of processing performed by the positioning wireless communication system 1000A of the present modification.

The operation of the positioning wireless communication system 1000A of the present modification will be described below with reference to the sequence diagrams of FIGS. 13 to 15. Note that detailed description of the same parts as those of the operation of the positioning wireless communication system 1000 of the first embodiment will be omitted.

(Step S0A):

In step S0A, the same processing as step S0 of the first embodiment is performed, and data D3_RTCM (mBS1) is transmitted from the calculation center SYS1 to the macro cell base station NWC1. Also, the data D3_RTCM (mBS2) is transmitted from the calculation center SYS1 to the macro cell base station mBS2 via the core network management station NWC1. In addition, the calculation center SYS1 transmits, as data D3_RTCM (mBS3), data (the position of the station, the carrier phase data acquired by itself, or the like), which is necessary for RTK positioning between the macro cell base station mBS3 and the mobile station, to the core network management station NWC1 via the mobile phone network management system MC1 and the mobile phone network NW_tel. Note that the data D3_RTCM (mBS3) is data generated in the calculation center SYS1 and is data obtained by converting data necessary in performing RTK positioning by the macro cell base station mBS3 into RTCM-format data. The core network management station NWC1 transmits the received data D3_RTCM (mBS3) to the macro cell base station mBS3. The macro cell base station mBS3 receives the data D3_RTCM (mBS3) transmitted from the core network management station NWC1. The macro cell base station mBS3 stores and holds the received data D3_RTCM (mBS3).

(Steps S1 to S10):

The processing of steps S5 to S10 is the same as the processing of the positioning wireless communication system 1000 of the first embodiment. Although not shown, processing of step S0 is also similar to that of the first embodiment.

(Step S11):

In step S11, based on GNSS data obtained by the GNSS receiving unit 13, the macro cell base station mBS2 to which communication connection is to be switched by handover processing transmits, as U-plane data (data U-plane (D_GNSS)), data indicating IDs of GNSS satellites from which radio waves have been received in good condition and the number of GNSS satellites from which radio waves have been received in good condition to the small cell base station sBS1.

The small cell base station sBS1 transmits the received data U-plane (D_GNSS) to the mobile station Mb1.

(Steps S12 to S14):

In step S12, the mobile station Mb1 obtains IDs of GNSS satellites from which radio waves have been received in good condition and the number of GNSS satellites from which radio waves have been received in good condition from the data U-plane (D_GNSS) received from the small cell base station sBS1, and determines whether the accuracy of RTK positioning can be ensured with the macro cell base station mBS1 as the position reference station. For example, when the number of satellites whose radio waves have been commonly received by the mobile station Mb1 and the macro cell base station mBS1 is 13 or more, the distance between the macro cell base station mBS1 and the mobile station Mb1 is 10 km or less; thus, the mobile station Mb1 determines that the position of the unknown point (mobile station Mb1) can be instantaneously calculated with high accuracy (positioning error within 4 cm) by RTK positioning.

In this case, in steps S13 and S14, the same processing as that of the first embodiment (the processing of steps S10 and S11 of the first embodiment) is performed.

(Steps S12 and S121)

In contrast, as shown in FIG. 11, in step S12, when the mobile station Mb1 determines that the accuracy of RTK positioning cannot be ensured with the macro cell base station mBS1 as the position reference station, the mobile station Mb1 requests the core network management station to perform search processing for a positioning reference station using U-plane data. In other words, the mobile station Mb1 transmits a request signal for performing search processing for a positioning reference station as data U-plane (Req_GNSS_search) to the core network management station via the small cell base station sBS1 and the macro cell base station mBS2 (Step S121). In this case, the mobile station Mb1 transmits data U-plane (Req_GNSS_search) including IDs of satellites from which GNSS signals have been received at the mobile station Mb1 and the number of satellites from which GNSS signals have been received at the mobile station Mb1 to the core network management station.

Note that a case when the mobile station Mb1 determines that the accuracy of the RTK positioning cannot be ensured with the macro cell base station mBS1 as the position reference station is, for example, a case when the number of satellites whose radio waves have been commonly received by the mobile station Mb1 and the macro cell base station mBS1 is small. In such a case, time required for RTK positioning becomes long, thus making it impossible to instantaneously acquire highly accurate positioning results.

(Steps S122 to S125)

In step S122, the core network management station performs search processing for a positioning reference station in response to the request from the mobile station Mb1. Specifically, the core network management station requests each macro cell base station via the core network to transmit GNSS data including information on IDs of GNSS satellites from which radio waves have been received and the number of GNSS satellites from which radio waves have been received to the core network management station in response to the request from the core network management station. From the data collected from each macro cell base station, the core network management station specifies a macro cell base station (1) at which the number of satellites from which the GNSS signal has been received in common with the mobile station Mb1 is 13 or more and (2) whose distance to the mobile station Mb1 is 10 km or less. In the case of FIG. 14, it is assumed that the specified macro cell base station is the macro cell base station mBS3.

The core network management station transmits resultant data Res for the above processing (data indicating that the macro cell base station serving as the position reference station is the macro cell base station mBS3) to the macro cell base station mBS2 as U-plane data (this data is referred to as data U-plane (D1+Res)).

The macro cell base station mBS2 recognizes from the data U-plane (D1+Res) from the core network management station that the macro cell base station serving as the reference point for RTK positioning with the mobile station Mb1 is the macro cell base station mBS3, and then transmits, using U-plane, only user data D1 transmitted from the core network management station to the mobile station Mb1 via the small cell base station sBS1 (step S123).

In step S124, the macro cell base station mBS3 transmits RTCM data (data RTCM3) including data necessary for RTK positioning to the core network management station as U-plane data (data U-plane (RTCM3)).

The core network management station transmits the received U-plane data U-plane (RTCM3) to the mobile station Mb1 via the macro cell base station mBS2 and the small cell base station sBS1.

The mobile station Mb1 obtains the data RTCM3 from the received U-plane data U-plane (RTCM3). Then, the mobile station Mb1 obtains the data necessary for RTK positioning from the obtained data RTCM3, and performs RTK positioning with the macro cell base station mBS3 set as the position reference station to measure the position of the mobile station Mb1. The distance between the macro cell base station mBS3 used as the position reference station and the mobile station Mb1 is guaranteed to be 10 km or less, and the number of GNSS satellites from which the GNSS signal has been commonly received at the macro cell base station mBS3 and the mobile station Mb1, thus allowing the mobile station Mb1 to instantaneously perform highly accurate positioning (positioning error of 4 cm or less).

As described above, when the mobile station Mb1 moves at a high speed from the macro cell macro_C1 to the macro cell macro_C2, RTK positioning is performed with a macro cell base station to which communication connection is to be switched by handover processing as the position reference station, and it is determined that high-accuracy and high-speed RTK positioning cannot be performed, the positioning wireless communication system 1000A searches a macro cell base station that is guaranteed to perform high-accuracy and high-speed RTK positioning. In the positioning wireless communication system 1000A, the macro cell base station that is guaranteed to perform high-accuracy and high-speed RTK positioning is used as the position reference station, and then the mobile station Mb1 performs RTK positioning, thereby allowing high-accuracy and high speed RTK positioning to be performed stably.

In the above description, the case where the macro cell base station serving as the position reference station is switched in accordance with the determination by the mobile station Mb1 has been described. However, in the positioning wireless communication system, the macro cell base station serving as the position reference station may be switched in accordance with other determination or judgment. For example, when it is determined that the accuracy of RTK positioning can be maintained when the macro cell base station is switched due to communication congestion, switching the macro cell base station for RTK positioning may not be done unlike the communication handover in which communication connection has been switched.

In other words, when it is determined that the accuracy of the RTK positioning can be maintained, the switching source and the switching destination for the communication handover may not be necessarily correspond to the switching source and the switching destination for switching macro cell base stations serving as the position reference station for RTK positioning, respectively.

Other Embodiments

In the above embodiment (including modified examples), the case where macro cell base stations serving as position reference stations are densely arranged so as to have a span of 10 km or less has been described. When it is difficult to arrange macro cell stations as described above due to landforms, the small cell base station may be equipped with a GNSS receiver to use the small cell base station as a position reference station. Alternatively, GNSS receivers may be installed so that position reference stations each have a span of 10 km or less.

In the above-described embodiment (including modified examples), the case where RTK positioning is used as the relative positioning has been described, but the present invention should not be limited to this; other positioning (for example, PPP, GDGPS, VRS, or the like) may be used. In that case, data necessary for performing the adopted positioning may be transmitted to the mobile station Mb1 as RTCM data, for example, using U-plane data. In the above-described embodiment (including the modified examples), the "carrier phase integrated value" has been described as being integrated in the calculation center, but the "carrier phase integrated value" may be integrated in association with the base station in a "cellular phone network management system" or a "core NW management station".

According to the present invention, since the accurate position of the position reference station (the macro cell base station in the above embodiment) can be constantly measured, the position reference station (the macro cell base station in the above embodiment) receives signals from the GNSS satellites, obtains the positioning data, and analyzes the positioning data at, for example, the calculation center SYS1, thereby allowing various highly accurate analyses to be performed. For example, it is possible to perform estimation processing and/or analysis processing of a model for water vapor delay due to ionospheric scintillation or atmospheric turbulence.

Further, some or all of the functional units of each device included in the positioning wireless communication system described in the above embodiments may be individually integrated into one chip with a semiconductor device such as an LSI, or may be integrated into one chip for some or all of the functional units to be included in the chip.

Note that although the term LSI is used here, it may also be called IC, system LSI, super LSI, or ultra LSI depending on the degree of integration.

Further, the method of circuit integration should not be limited to LSI, and it may be implemented with a dedicated circuit or a general-purpose processor. A field programmable gate array (FPGA) that can be programmed after the LSI is manufactured, or a reconfigurable processor that can reconfigure connection and setting of circuit cells inside the LSI may be used.

Further, a part or all of the processing of each functional block of each of the above embodiments may be implemented with a program. A part or all of the processing of each functional block of each of the above-described embodiments is then performed by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware.

For example, when functional units of the above embodiments and modifications is achieved by using software, the hardware structure (the hardware structure including CPU, ROM, RAM, an input unit, an output unit or the like, each of which is connected to a bus) shown in FIG. 17 may be employed to achieve the functional units by using software.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded.

Examples of the computer readable recording medium include a flexible disk, a hard disk, a CD-ROM, an MO, a DVD, a DVD-ROM, a DVD-RAM, a large capacity DVD, a next-generation DVD, and a semiconductor memory.

The computer program may not be recorded on the recording medium but may be transmitted with an electric communication line, a radio or cable communication line, or a network such as the Internet.

The specific structures described in the above embodiments are mere examples of the present invention, and may be changed and modified variously without departing from the scope and the spirit of the invention.

REFERENCE SIGNS LIST

1000, 1000A, 2000 positioning wireless communication system
mBS1, mBS2, mBS3 macro cell base station
sBS1 small cell base station
13 GNSS receiving unit
115 U-plane signal processing unit
116 C-plane signal processing unit
Dev4 correction processing device

What is claimed is:

1. A positioning system comprising:
a plurality of first base stations;
a mobile station;
a management station for controlling handover between the first base stations; and
a base station position calculation system;
wherein the first base station includes a first receiving device that receives positioning signals transmitted from a plurality of positioning satellites as first positioning signals, is set as a position reference station for position measurement, and serves as a base station of a mobile phone network,
the mobile station includes a second receiving device that receives positioning signals transmitted from a plurality of positioning satellites as second positioning signals,
the management station controls switching of the first base station, which serves as the position reference station, in conjunction with handover for communication of the mobile telephone network,
the first receiving device of the first base station transmits, as first positioning information, positioning information that is obtained from the first positioning signal and includes at least a carrier phase integrated value and a pseudo range to the base station position calculation system,
the first base station includes a communication interface for transmitting information for correcting an error in positioning based on the second positioning signal to the mobile station as correction information along with station position information of the first base station;
the mobile station includes a position calculation unit that performs mobile station position calculation processing that calculates a mobile station position, which is a position of the mobile station, using a real-time kinematic method, based on the carrier phase integrated value derived from the second positioning signal and the carrier phase integrated value derived from the station position information of the first base station transmitted from the first base station and the first positioning signal,
the base station position calculation system includes:
a receiving unit that collects the first positioning information transmitted from each of the plurality of first base stations;
a coordinate calculation unit that calculates a position of the first base station in the world geodetic coordinate system based on the first positioning information collected within a predetermined time and obtains the calculated position as accurate position information; and a transmission unit that transmits the accurate position information of each of the plurality of first base stations, which is calculated by the coordinate calculation unit, to the corresponding first base station.

2. The positioning system according to claim 1, wherein the base station position calculation system transmits error information, which is information about a difference between a public coordinate system generated based on electronic reference points and not updated for a predetermined period, and a world geodetic coordinate system generated based on position information obtained by accurate position measurement, to the first base station.

3. The positioning system according to claim 1, wherein when the handover of communication of the mobile telephone network in which communication connection is switched from a handover source base station that is one of the first base stations to a handover destination base station that is another of the first base stations has been performed, the mobile station performs the mobile station position calculation processing based on (1) the carrier phase integrated value derived from the second positioning signal and (2) the carrier phase integrated value derived from the station position information of the first base station transmitted from the handover destination base station and the first positioning signal.

4. The positioning system according to claim 1, wherein when the handover of communication of the mobile telephone network in which communication connection is switched from a handover source base station that is one of the first base stations to a handover destination base station that is another of the first base stations has been performed, the mobile station performs the mobile station position calculation processing based on (1) the carrier phase integrated value derived from the second positioning signal and (2) the carrier phase integrated value derived from the station position information of the first base station transmitted from a positioning switch destination base station that is a first base station different from the handover destination base station and that is within a predetermined distance from the mobile station and the first positioning signal.

5. The positioning system according to claim 1, wherein the plurality of first base stations each includes:

a small cell base station having a small cell, which is an area of a first size, as a communicable area; and a first macro cell base station that has a macro cell, which is an area larger than the small cell, as a communicable area and that has a GNSS reception function of receiving radio waves transmitted from GNSS satellites and obtains GNSS data from the radio waves, the macro cell base station transmits positioning data that is data obtained from the GNSS data by the macro cell base station and that is used for positioning with GNSS satellites to the small cell base station in a small cell in which the mobile station exists as user plane data addressed to the mobile station, the user plane data being data used for communication processing in small cells using user planes, the small cell base station transmits the user plane data including the positioning data received from the macro cell base station to the mobile station, the mobile station obtains the positioning data from the user plane data from the small cell base station, and performs positioning of the mobile station using the obtained positioning data and the GNSS data obtained from the radio waves received by the mobile station from the GNSS satellites.

6. The positioning system according to claim 5, further comprising a second macro cell base station that has a macro cell, which is an area larger than the small cell, as a communicable area and that has a GNSS reception function of receiving radio waves transmitted from GNSS satellites and obtains GNSS data from the radio waves, wherein when (A) the mobile station moves from a first macro cell that is a macro cell of the first macro cell base station to a second macro cell that is a macro cell of the second macro cell base station, (B) handover processing in which a source of control plane data for performing control using the macro cell is handed over from the first macro cell base station to the second macro cell base station is performed, and (C) a process of changing a transmission source of the positioning data transmitted from the macro cell base station for positioning the mobile station to the mobile station from the first macro cell base station to the second macro cell base station is performed, after the above process is performed, the second macro cell base station transmits the positioning data obtained by the second macro cell base station to the small cell base station of the small cell in which the mobile station exists as user plane data addressed to the mobile station, the small cell base station transmits the user plane data including the positioning data received from the macro cell base station to the mobile station, the mobile station obtains the positioning data from the user plane data transmitted from the second macro cell base station via the small cell base station, and performs positioning of the mobile station using the obtained positioning data and the GNSS data obtained from radio waves received by the mobile station from the GNSS satellites.

7. The positioning system according to claim 5 further comprising second to N-th macro cell base stations that each have a macro cell, which is an area larger than the small cell, as a communicable area and that each have a GNSS reception function of receiving radio waves transmitted from GNSS satellites and obtains GNSS data from the radio waves, when (A) the mobile station moves from a first macro cell that is a macro cell of the first macro cell base station to a second macro cell that is a macro cell of the second macro cell base station, (B) handover processing in which a source of control plane data for performing control using the macro cell is handed over from the first macro cell base station to the second macro cell base station is performed, and (C) the number of the GNSS satellites whose radio waves can be received in common by the mobile station and the second macro cell base station is less than a predetermined number, a process of changing a transmission source of the positioning data transmitted from the macro cell base station for positioning the mobile station to the mobile station from the first macro cell base station to a macro cell base station that is different from the second macro cell base station and in which the number of GNSS satellites that can be received in common with the mobile station is larger than a predetermined number is performed.

8. The positioning system according to claim 5, including a plurality of macro cell base stations that each have a GNSS receiving function of receiving radio waves transmitted from GNSS satellites and each obtain GNSS data from the radio waves, and wherein among the plurality of macro cell base stations, at least one set of macro cell base stations is arranged such that their mutual distance is equal to or less than a predetermined distance.

9. A positioning method used in a wireless communication system that communicates with a mobile station having a GNSS receiving function by using a small cell base station whose communicable area is a small cell having an area of a first size and a macro cell base station whose communicable area is a macro cell having an area larger than the small cell, the macro cell base station having a GNSS receiving function that receives radio waves transmitted from GNSS satellites and obtains GNSS data from the radio waves, the positioning method comprising:

a first transmission step of transmitting positioning data that is data obtained from the GNSS data by the macro cell base station and that is used for positioning with GNSS satellites to the small cell base station in a small cell in which the mobile station exists as user plane data that is data used for communication processing in the small cell using user planes;

a second transmitting step of transmitting the positioning data received by the small cell base station from the small cell base station to the mobile station; and a positioning step of positioning the mobile station using the positioning data received from the small cell base station and the GNSS data obtained from the radio waves received by the mobile station from the GNSS satellites.

* * * * *